(12) United States Patent
Kim et al.

(10) Patent No.: US 7,997,103 B2
(45) Date of Patent: *Aug. 16, 2011

(54) TUB HAVING STRUCTURALLY STRENGTHENED REAR WALL AND WASHING MACHINE WITH THE SAME THEREIN

(75) Inventors: Gon Kim, Jinhae-si (KR); Chi Wan Hur, Changwon-si (KR); Yu Beom Kang, Gunpo-si (KR); Sang Man Je, Geoje-si (KR); Kang Mo Choi, Masan-si (KR); Jae Kyum Kim, Gimhae-si (KR); Ho Cheol Kwon, Changwon-si (KR); Yong Suck Park, Changwon-si (KR); Ig Geun Kweun, Changwon-si (KR); Kyu Hwan Lee, Busan (KR)

(73) Assignee: LG Electronics Inc., Seoul (KR)

( * ) Notice: Subject to any disclaimer, the term of this patent is extended or adjusted under 35 U.S.C. 154(b) by 512 days.

This patent is subject to a terminal disclaimer.

(21) Appl. No.: 11/413,113

(22) Filed: Apr. 28, 2006

(65) Prior Publication Data

US 2007/0113596 A1 May 24, 2007

Related U.S. Application Data

(63) Continuation-in-part of application No. 10/730,281, filed on Dec. 9, 2003, now Pat. No. 7,418,843.

(30) Foreign Application Priority Data

Dec. 10, 2002 (KR) .................................. 2002-78337
Dec. 2, 2003 (KR) .................................. 2003-86841

(51) Int. Cl.
*D06F 23/00* (2006.01)
*D06F 37/26* (2006.01)
(52) U.S. Cl. ......................................................... 68/140
(58) Field of Classification Search ................ 68/24, 58, 68/140, 144
See application file for complete search history.

(56) References Cited

U.S. PATENT DOCUMENTS

| 2,705,763 | A | 4/1955 | Skrobishch |
| 3,227,030 | A | 1/1966 | Preziosi et al. |

(Continued)

FOREIGN PATENT DOCUMENTS

AU 199675404 B2 12/1996

(Continued)

OTHER PUBLICATIONS

Original Request for Reexamination of Corresponding Patent No. 7,418,843 filed Dec. 15, 2008.

(Continued)

*Primary Examiner* — Joseph L Perrin
(74) *Attorney, Agent, or Firm* — McKenna Long & Aldridge LLP

(57) ABSTRACT

A tub having a structurally strengthened rear wall and a washing machine with the same therein are disclosed. A washing machine includes a bearing housing having a flange part and a tub injection-molded with the bearing housing inserted into a wall thereof, the wall having a recessing part and a projecting part formed on an inner or an outer surface thereof along a circumferential direction, and a circumferential rib or a radial rib formed on the recessing part.

14 Claims, 21 Drawing Sheets

U.S. PATENT DOCUMENTS

| | | | |
|---|---|---|---|
| 3,886,256 A | | 5/1975 | Ohuchi et al. |
| 4,216,663 A | * | 8/1980 | Shacklock ............... 68/3 R |
| 4,995,598 A | | 2/1991 | Ingham |
| 5,040,285 A | | 8/1991 | Williams et al. |
| 5,150,589 A | | 9/1992 | Williams et al. |
| 5,266,855 A | | 11/1993 | Smith et al. |
| 5,329,791 A | * | 7/1994 | Cargnel et al. .............. 68/24 |
| 5,489,811 A | | 2/1996 | Kern et al. |
| 5,737,944 A | | 4/1998 | Nishimura et al. |
| 5,809,809 A | | 9/1998 | Neumann |
| 6,257,027 B1 | | 7/2001 | Imai |
| 6,279,357 B1 | * | 8/2001 | Didlick et al. ............. 68/20 |
| 6,460,382 B1 | | 10/2002 | Kim et al. |
| 6,477,869 B2 | | 11/2002 | Heyder et al. |
| 7,380,424 B2 | * | 6/2008 | Kim et al. ................. 68/140 |
| 7,418,843 B2 | | 9/2008 | Kim et al. |
| 7,444,841 B2 | * | 11/2008 | Kim et al. ............... 68/12.01 |
| 2002/0194884 A1 | | 12/2002 | Heyder et al. |
| 2006/0196233 A1 | * | 9/2006 | Kim et al. ................. 68/140 |
| 2007/0113597 A1 | * | 5/2007 | Kim ........................... 68/140 |
| 2007/0125135 A1 | * | 6/2007 | Kim et al. ................. 68/140 |

FOREIGN PATENT DOCUMENTS

| | | |
|---|---|---|
| AU | 199675438 B2 | 12/1996 |
| AU | 199675404 B2 | 6/1997 |
| AU | 199675438 B2 | 6/1997 |
| CN | 1274782 | 11/2000 |
| CN | 1293276 | 5/2001 |
| DE | 4335966 | 4/1995 |
| DE | 19859568 | 6/2000 |
| EP | 0219115 A2 | 4/1987 |
| EP | 0219115 A2 | 4/1987 |
| EP | 0361775 A2 | 4/1990 |
| EP | 0361775 A2 | 4/1990 |
| EP | 0620308 A2 | 10/1994 |
| EP | 0620308 A2 | 10/1994 |
| EP | 1079014 A1 | 2/2001 |
| EP | 1079014 A1 | 2/2001 |
| EP | 1094144 A2 | 4/2001 |
| EP | 1094144 A2 | 4/2001 |
| EP | 1094145 A2 | 4/2001 |
| EP | 1094145 A2 | 4/2001 |
| EP | 1116812 A1 | 7/2001 |
| EP | 1116812 A1 | 7/2001 |
| EP | 1428 924 A1 | 6/2004 |
| GB | 2030896 A | 4/1980 |
| GB | 2030896 A | 4/1980 |
| GB | 2332212 A | 6/1999 |
| GB | 2332212 A | 6/1999 |
| GB | 2 333 300 A | 7/1999 |
| GB | 2333300 A | 7/1999 |
| GB | 2333300 A | 7/1999 |
| JP | 58207834 | 12/1983 |
| JP | 9-182368 | 7/1997 |
| JP | 2000-42287 | 2/2000 |
| JP | 2000-116037 | 4/2000 |
| JP | 2000-325693 | 11/2000 |
| KR | 20-1992-0012151 | 7/1992 |
| KR | 1997-0051370 | 10/1997 |
| KR | 20-1998-0058943 | 10/1998 |
| KR | 1999 0030909 | 5/1999 |
| KR | 1999-0030909 | 5/1999 |
| KR | 1999-0081170 | 11/1999 |
| KR | 1020010088215 A | 9/2001 |
| WO | WO 01/44556 A1 | 6/2001 |
| WO | WO 01/44556 A1 | 6/2001 |
| WO | WO 02/084842 A1 | 10/2002 |
| WO | WO 02/084842 A1 | 10/2002 |

OTHER PUBLICATIONS

Decision Granting Request for Reexamination of Corresponding Patent No. 7,418,843 issued Jan. 23, 2009.

Original Request for Reexamination for Corresponding Patent No. 7,380,424 filed Nov. 14, 2008.

Corrected Request for Reexamination of Corresponding Patent No. 7,380,424 filed Jan. 28, 2009.

Decision Granting Request for Reexamination of Corresponding Patent No. 7,380,424 issued on Feb. 26, 2009.

Plaintiff's Memorandum in Opposition to Motion to Stay and in Support of Cross-Motion for Preliminary Injunction filed May 18, 2009 in pending litigation against ASKO Appliance Inc. et al.

Complaints in pending litigation against ASKO Appliance Inc., et al. filed Nov. 5, 2008.

Defendants' Reply in Further Support of Defendants' Reply in pending litigation against ASKO Appliance Inc, et al. filed May 29, 2009.

Declaration in Support of Defendants' Reply in pending litigation against ASKO Appliance Inc., et al. filed May 29, 2009 (including Exhibits 1-7).

Order Denying Defendants' Motion for Stay and Dismissing Plaintiff's Motion for Preliminary Injunction in pending litigation against ASKO Appliance Inc., et al. filed Jun. 17, 2009.

* cited by examiner

US 7,997,103 B2

TUB HAVING STRUCTURALLY STRENGTHENED REAR WALL AND WASHING MACHINE WITH THE SAME THEREIN

This application is a continuation-in-part of application Ser. No. 10/730,281 filed on Dec. 9, 2003, which claims priority of Korean Patent Application 10-2002-0078337 and 10-2003-0086841 filed in Korea on Dec. 10, 2002 and on Dec. 2, 2003, which are hereby incorporated by reference as if fully set forth herein.

BACKGROUND OF THE INVENTION

1. Field of the Invention

The present invention relates to a tub having a structurally strengthened rear wall and a washing machine with the same therein, and more particularly, to a tub injection-molded with a bearing housing inserted supporting a shaft to rotate a drum.

2. Discussion of the Related Art

In general, a drum type washing washes laundry by using a friction force between a drum rotated by a driving power of a motor and the laundry in a state detergent, washing water, and the laundry are introduced into the drum, shows almost no damage to, and entangling of the laundry, and has pounding, and rubbing washing effects.

In the related art drum type washing machines, there are an indirect drive type in which the driving power of the motor is transmitted to the drum through a belt wound on a motor pulley and a drum pulley indirectly, and a direct drive type in which the brushless DC (BLDC) motor is connected to the drum directly, to transmit the driving power of the motor to the drum, directly.

The type in which the driving power of the motor is transmitted to the drum, not directly, but indirectly through the motor pulley and the drum pulley, has much energy loss in the course of power transmission, and causes much noise in the course of power transmission.

According to this, it is the present trend that use of the direct drive type drum type washing machines with the BLDC motor is increasing, for solving the problems of the indirect drive type drum type washing machines. A related art direct drive type drum type washing machine will be described with reference to FIG. 1, briefly. FIG. 1 illustrates a longitudinal section of a related art drum type washing machine.

Referring to FIG. 1, the related art drum type washing machine is provided with a tub 2 mounted inside of a cabinet 1, and a drum 3 rotatably mounted on a central part of an inside of the tub 2. There is a motor in rear of the tub 2, wherein a stator 6 is fixed to a rear wall of the tub, and a rotor 5 surrounds the stator 6, and is connected to the drum 3 with a shaft passed through the tub.

Together with these, there is a metallic tub supporter between a tub rear wall and the stator having a shape almost the same with an outer shape of the tub rear wall fixed to the tub rear wall in fastening the stator for supporting a load of the stator, and maintaining a concentricity of the stator.

In the meantime, there are a door 21 mounted on a front part of the cabinet 1, and a gasket 22 between the door 21 and the tub 2.

There are a hanging spring 23 between an inside surface of an upper part of the cabinet 1, and an upper part of an outside circumferential surface of the tub 2, and a friction damper 24 between the inside surface of a lower part of the cabinet 1, and a lower part of the outside circumferential surface of the tub 2.

FIG. 2 illustrates a perspective outside view of the stator in FIG. 1, and FIG. 3 illustrates a perspective view of a sectional type core SC applied to the stator in FIG. 2.

In a related art method for fabricating the stator core, a sheet of metal plate is pressed to form a unit core having tooth portions 151, a base part 150, and a round part 500 opposite to the tooth portions 151 for forming fastening hole 500a therein, the unit cores are stacked to form a unit core assembly, and the unit core assemblies are connected to each other in a circumferential direction, to complete fabrication of the stator core, called the sectional type core SC.

The round part provides the fastening hole 500a for fixing the stator 6 to the rear wall of the tub, and enduring a fastening force of a bolt.

However, the method for fabricating the stator 6 by means of the sectional type cores SC has, not only a complicate fabrication process, but also loss of much material.

Therefore, even if a helical type core HC is favorable, in which a sheet of steel plate having the tooth portions 151 and the base part 150 is stacked turning in a helix, since it is required to bend the sheet of metal punched out in a form of a band into the helix, the helical type core has a drawback in that the round part for fixing the stator to the tub can not be formed on an inner side of the core.

This is because, if the round part 500 is formed on the inner side of the core in fabrication of the helical core HC, a large width of the core at a part having the round part formed thereon impedes bending of the core.

Therefore, currently, a stator structure is required, in which a function the same with the round part of the sectional type core SC is made to be carried out, not by the core itself, but by other part, for employing the helical type core HC.

For reference, a reason why it is important to secure an adequate rigidity of the round part having the fastening hole formed in for fixing the stator to the tub is as follows.

The washing machine that rotates the drum directly by using the BLDC motor has the stator mounted on a rear part of the tub, directly. In a case of the motor for a large capacity drum type washing machine with more than 1.5 kg of stator net weight, and a spinning speed in a range of 600-2000 RPM, it is liable that a bolt fastened part of the stator 6 is broken due to the stator weight, vibration in the high speed rotation, and shaking and deformation of the rotor 5.

Particularly, in a case of the drum type washing machine, in which the BLDC motor is used, and the stator 6 is fixed to the tub rear wall, where an axis direction of the stator 6 is substantially parallel to ground, the vibration generated in operation of the washing machine causes intensive damage to the fastening part of the stator 6 to the tub rear wall.

Thus, an adequate rigidity of the round part having the fastening hole formed therein is very important in fixing the stator 6 to the tub.

In the meantime, in a trend a capacity of the drum type washing machine becomes larger as the time goes by, there have been many problems, such as even the tub to which the stator is fastened is damaged in a case the stator has a weight more than 1.5 kg in a structure the axis of the stator is parallel to the ground like the drum type washing machine.

Therefore, in order to prevent occurrence of the damage, in the related art structure, in general a metal tub supporter is lined, when a process for fastening the tub supporter to the tub rear wall is required in addition to an assembly line, that drops a productivity.

FIG. 4 illustrates a conventional tub 302, more specifically, an outer surface of the rear wall where the motor is mounted.

As shown in FIG. 4, a circumferential rib 311 and 312 is formed in a circumferential direction on the outer surface of the rear wall of the tub 302, and a radial rib 321 is also formed on the outer surface of the rear wall in a radial direction. The farther the radial rib 321 is from the center of the rear wall, the lower the height thereof is. Thus, the rear wall of the tub may have a problem in its strength and rigidity. Furthermore, the distance between the radial ribs is gradually getting wider from the center thereof. Thereby, the strength of the rear wall of the tub is not high enough and it causes a structural-strength-related problem in the farthest portion of the rear wall from the center.

Also, the thickness between the circumferential rib 311 formed nearer to the center of the rear wall and the circumferential rib 312 formed farther from the center is the same. Since the nearer portion to the center is more affected by the vibration of the shaft than the farther portion, the nearer portion is needed to have much strength and rigidity. Nevertheless, the conventional washing machine fails to solve the above problem.

Moreover, according to the conventional washing machine, the circumferential rib 311 and 312 and the radial rib 321 are formed relatively high to enhance the strength of the rear wall of the tub. However, the higher the ribs are, the more flexible the ribs are. Thereby, the strength or rigidity is not gained as high as structurally required and it causes a structural-strength-related problem as well as high production cost.

Meanwhile, since the inner surface (not shown) of the rear wall of the tub is formed as a smooth surface without ribs, the reinforcement for the strength is dependent on the ribs on the outer surface only. That is one of the reasons why the ribs on the outer surface are high in the conventional washing machine.

The capacity of the tub for holding wash water therein influences the capacity of the washing machine. Here, the capacity of the tub is influenced by the position of the inner surface of the rear wall. Since the conventional rear wall of the tub described above has the inner surface thereof sided toward the drum, the conventional rear wall of the tub has a disadvantage that the tub has a small capacity.

Also, the overall thickness of the rear wall of the tub with the height of the rib considered may affect the disposition of the other components within the limited space of the cabinet.

SUMMARY OF THE INVENTION

Accordingly, the present invention is directed to a tub having a structurally strengthened rear wall and a washing machine with the same therein that substantially obviates one or more problems due to limitations and disadvantages of the related art.

An object of the present invention is to provide a tub having a structurally strengthened rear wall and a washing machine with the same therein, wherein the rear wall of the tub with a bearing housing inserted therein has a recessing part and a projecting part along a circumferential direction and a flange part of the bearing housing has a recessing part and projecting part corresponding with the recessing part and the projecting part of the rear wall.

Another object of the present invention is to provide a tub manufactured by injection-molding process with a bearing housing inserted into the mold, wherein the tub does not cause a problem due to stress concentration especially in the place near to the outer end of the flange of the bearing housing.

A third object of the present invention is to provide a rear wall of a tub having a recessing part and a projecting part thereon for reinforcing the strength and rigidity. Especially, the ribs are formed on the recessing part to maintain the predetermined overall thickness of the rear wall of the tub, such that the disposition of other components and the capacity of the tub are not affected.

A fourth object of the present invention is to help a drum to rotate smoothly by thickening the circumferential rib nearest to the center of the rear wall and structurally strengthening the center portion affected by the vibration of the shaft most, such that the shaft is supported securely.

Recently, there have been demands for a washing machine with a large capacity. Also, the demands for a tub having a structurally strengthened rear wall have increased. Thus, the present invention is invented to satisfy the demands and to provide a rear wall of a tub having no problems of the related art in a washing machine with a large capacity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a washing machine comprising a bearing housing having a flange part; and a tub injection-molded with the bearing housing inserted into a wall thereof, the wall having a recessing part and a projecting part formed on an inner or an outer surface thereof along a circumferential direction, and a circumferential rib or a radial rib formed on the recessing part.

The wall of the tub, as shown in FIG. 1, is a rear wall in a front loading type washing machine, and a vertical wall of a left side or a right side in a top loading type washing. The wall is a portion where a bearing housing for supporting a shaft rotating a drum is inserted, regardless of any type of washing machines. The front loading type washing machine is presented as an example as follows, and the present invention may be applied to any type of washing machines included in the scope of the present invention.

According to the present invention, the bearing housing and the tub may be fastened securely, because the bearing housing is inserted into the rear wall of the tub. In addition, since the bearing housing has the flange part, the strength and rigidity of the rear wall of the tub can be enhanced by the flange part, and the tub and the bearing housing can be connected securely.

Furthermore, the strength and rigidity of the rear wall can be more enhanced, because the rear wall has the recessing part and the projecting part. The recessing part and the projecting part can be formed on an inner surface or an outer surface of the rear wall. Preferably, the recessing part and the projecting part are formed on the both of the inner and outer surface of the rear wall.

Here, a circumferential rib or a radial rib is formed on the recessing part in a circumferential direction to structurally strengthen the wall. Preferably, the circumferential rib and the radial rib are formed.

The present invention is invented through a lot of experiments and computer aided engineering. The inventor is motivated to find a problem of crack caused in case that a circumferential rib is provided on the same circumference as the circumference of an outer end of the flange part of the bearing housing. The inventor found that the biggest reason is the stress concentration on the end of the circumferential rib.

Therefore, it is preferred that the circumferential rib is spaced apart from an outer end of the flange part in a radial direction. That is, the circumferential rib is preferred not to be provided on the same circumference as the circumference of the outer end of the flange part.

Preferably, a circumferential rib or a radial rib is formed on the projecting part on the same circumference of the outer end of the flange part.

Especially, in case that the circumferential rib is provided on the same circumference as the circumference of the outer end of the flange part, the circumferential rib or the radial rib is more necessarily provided on the projecting part.

In connection with the structural strength, the correlation between the potion of the circumferential rib and the outer end of the flange part is found through many experiments and a process of trial and error, and the above technical solution has the most preferable result out of the various trials.

Moreover, preferably, the flange part of the bearing housing has a recessing part and a projecting part corresponding with the recessing part and the projecting part of the wall, respectively. It is more preferable that the flange part has an embossing appearance corresponding with the embossing appearance of the rear wall of the tub for the recessing and the projecting parts.

At least one portion of the radial rib formed on the recessing part of the wall is inclined upwardly from the center of the wall. Especially, as far as the strength is concerned, it is preferable that the inclined portion is a portion of the rear wall where the flange part is not inserted, since the portion where the flange part is inserted is reinforced enough by the flange part. That is, the farther outwardly from the outer end of the flange part, the higher the radial rib is.

Since the flange part is inserted into the near portion of the rear wall from the center and the distance between the radial ribs is narrow, the center portion of the rear wall is structurally strengthened. Whereas, the other portions are not strengthened enough. Thus, the strength is reinforced by heightening the radial rib.

Preferably, the circumferential rib and the radial rib formed on the recessing part of the wall of the tub cross. In case that they do not cross, the inventor found through the experiments and computer aided engineering that the stress is concentrated. Also, preferably, the height of the circumferential rib and the height of the radial rib are the same due to the same reason.

Since it is affected a lot by the vibration of the shaft, the inner center portion of the rear wall of the tub should be structurally strengthened. For that reason, the circumferential rib formed on the recessing part of the wall of the tub is provided in plural, and the circumferential rib nearest to the center is thicker than the other circumferential ribs.

The circumferential rib nearest to the center is formed in the same circumference as a circumference of a boss for allowing a stator fastened thereto.

Preferably, the flange part has a circumferential rib, and more preferably, the circumferential rib of the flange part is inserted into the nearest circumferential rib of the tub to the center.

An object of the present invention is to provide a drum type washing machine, which has an outer rotor type motor with a stator of which material and weight required for fabrication can be reduced, fabrication of which can be simplified, and secure mounting of which on the tub is possible.

Other object of the present invention is to provide a drum type washing machine, in which a tub can sustain weight and vibration of a BLDC motor for a washing machine mounted on a tub wall directly, which motor has a net stator weight more than 1.5 kg, and variable rotational speed of 0-2000 RPM or over.

Another object of the present invention is to provide a drum type washing machine, which can dispense with a tub supporter fastening process from an assembly line, that can secure a supporting force of the tub rear wall to the stator, and simplifies an assembly process.

Further object of the present invention is to provide a drum type washing machine, which enables a service man to carry out maintenance in repair and replacement of components.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the drum type washing machine includes a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

In other aspect of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having three or more than three fastening holes projected toward an inside of the helical type core for fastening the stator to the bearing housing.

In another aspect of the present invention, there is provided a drum type washing machine including a tub of a plastic having a wall for holding washing water therein and mounting a driving part thereon a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended from the bearing supporting part exposed to an outside of the tub, with stator fastening holes formed in an exposed part of the stator fastening part, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

In further object of the present invention, there is provided a drum type washing machine including a tub of a plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended in a radial direction from the bearing supporting part exposed to an outside of the tub, with stator fastening holes formed in an exposed part of the stator fastening part, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having three or more than three fastening holes projected toward an inside of the helical type core for fastening the stator to the bearing housing.

In still further object of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor.

In yet further aspect of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended in a radial direction from the bearing supporting part exposed to an outside of the tub, with stator fastening holes formed in an exposed part, a rotor engaged to a rear end part of the shaft to form the motor together with the stator; and the stator with a weight heavier than 1.5 kg mounted on the stator fastening part of the bearing housing with fastening members on an inner side of the rotor to form the motor together with the rotor.

In still yet further aspect of the present invention, there is provided a drum type washing machine including a tub having a wall for holding washing water therein and mounting a driving part thereon, and a sleeve form of bearing supporting part for supporting bearings, in which both the tub and the bearing supporting part are formed as one unit, a drum rotatably arranged inside of the tub, a shaft passed through the tub and connected to the drum for transmission of a driving power from a motor to the drum, at least one bearing inside of the bearing supporting part for supporting the shaft, a rotor engaged to a rear end part of the shaft to form the motor together with the stator, and the stator mounted on the tub on an inner side of the rotor and an outer side of the bearing supporting part with fastening members, wherein the stator includes an annular helical type core having multiple layers formed by winding a steel plate having tooth portions and base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
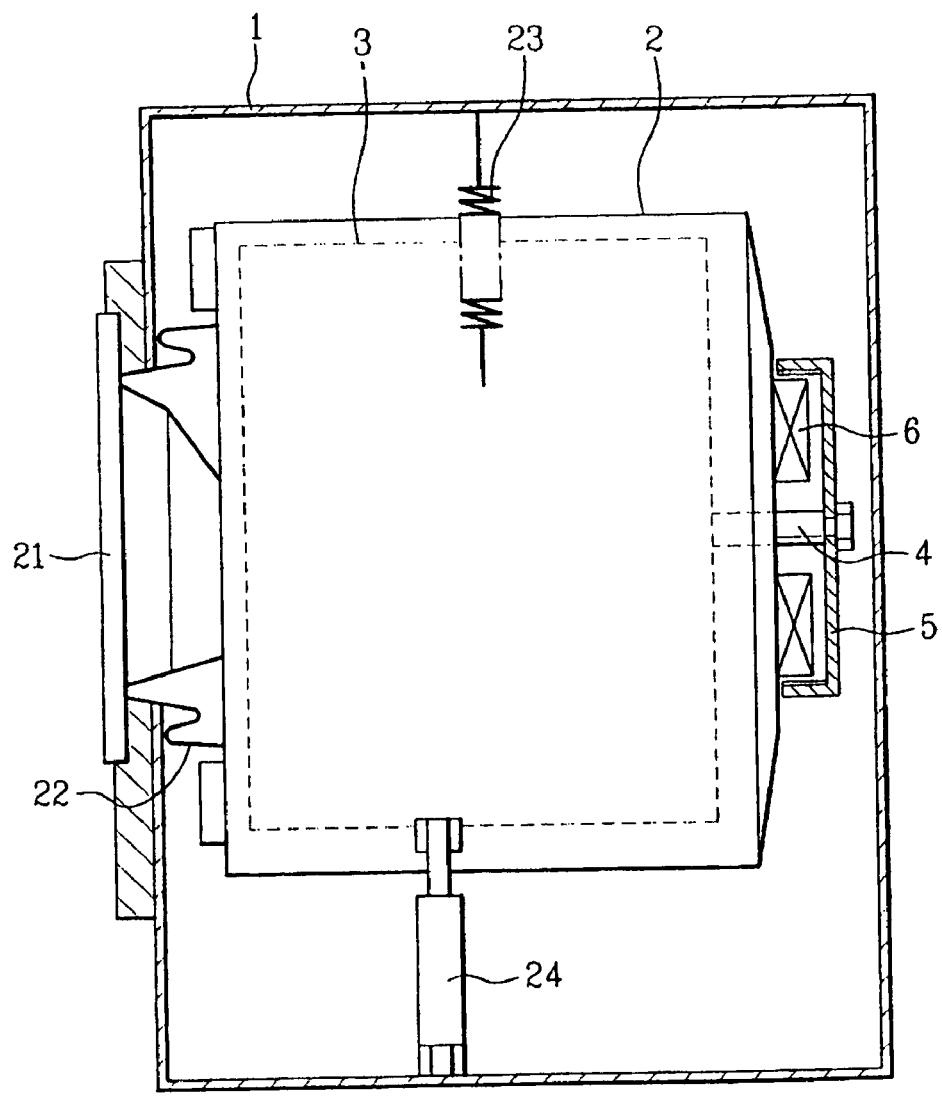
FIG. 1 is a diagram illustrating a conventional drum type washing machine according to the related art.
Figure 2:
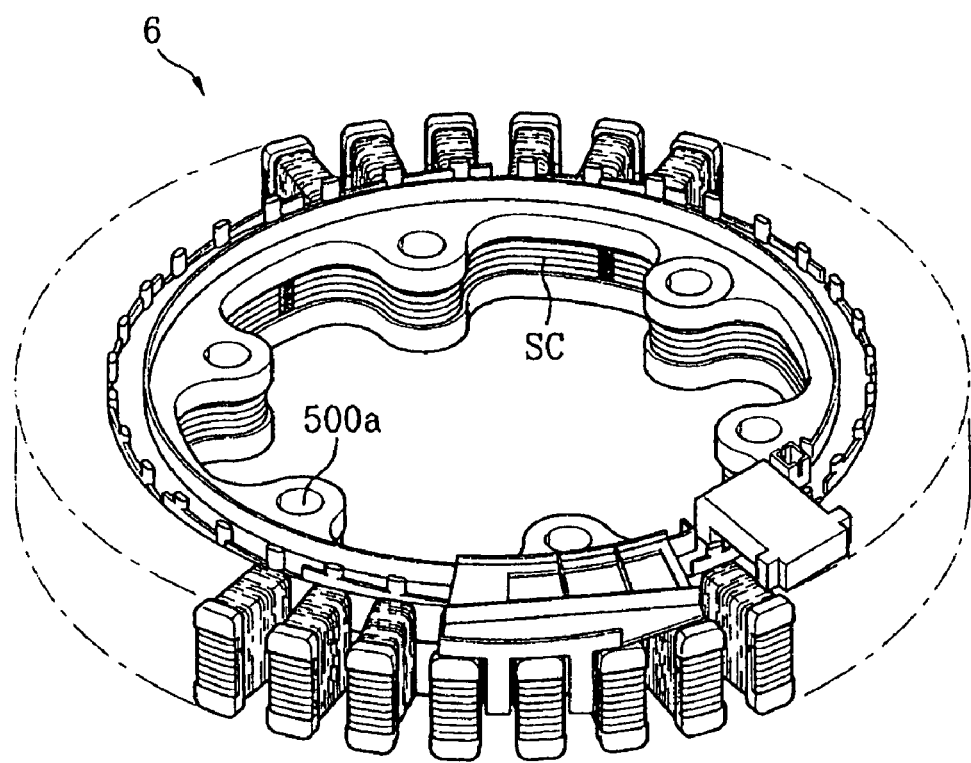
FIG. 2 illustrates a perspective view of a related art stator.
Figure 3:
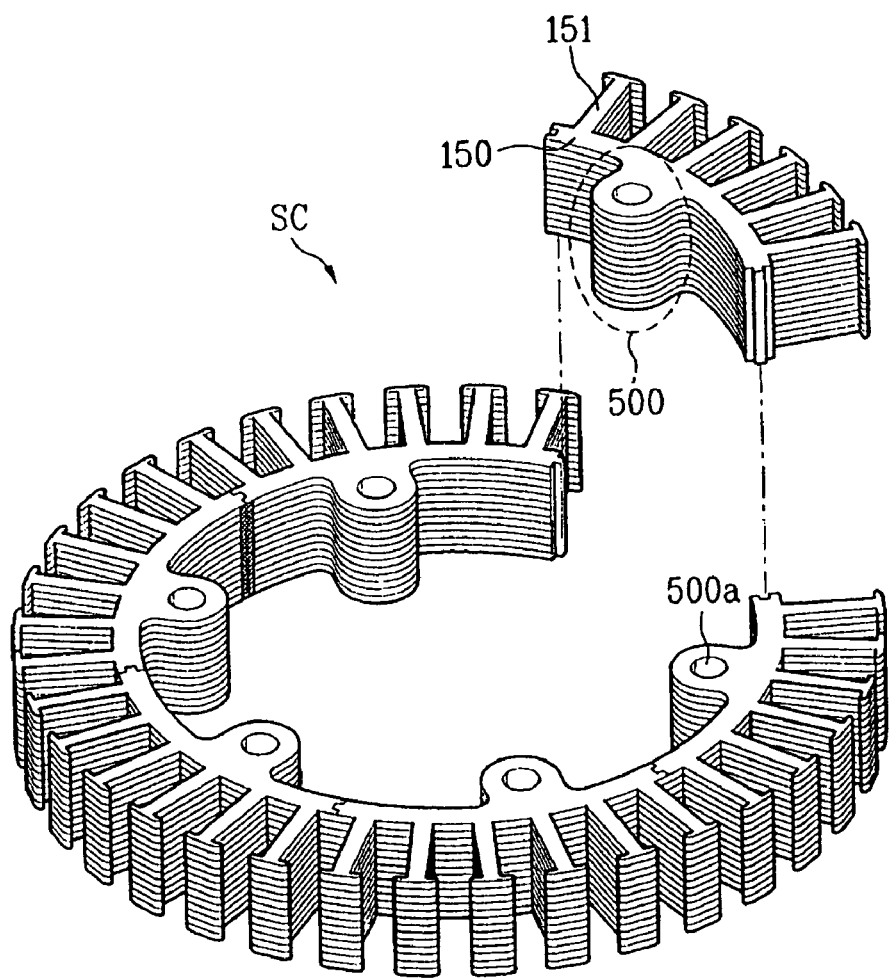
FIG. 3 illustrates a perspective view of a sectional type core.
Figure 4:
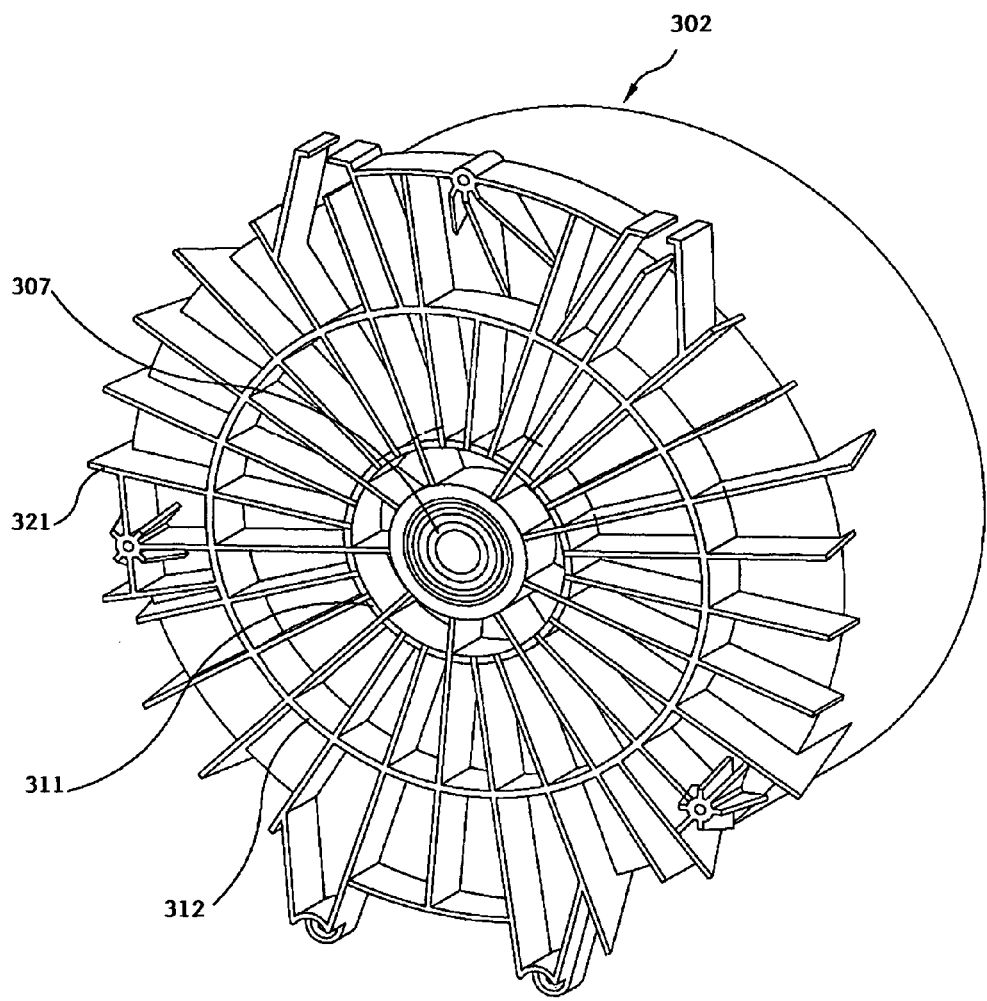
FIG. 4 is a diagram illustrating a conventional tub injection-molded with a bearing housing inserted therein.
Figure 5:
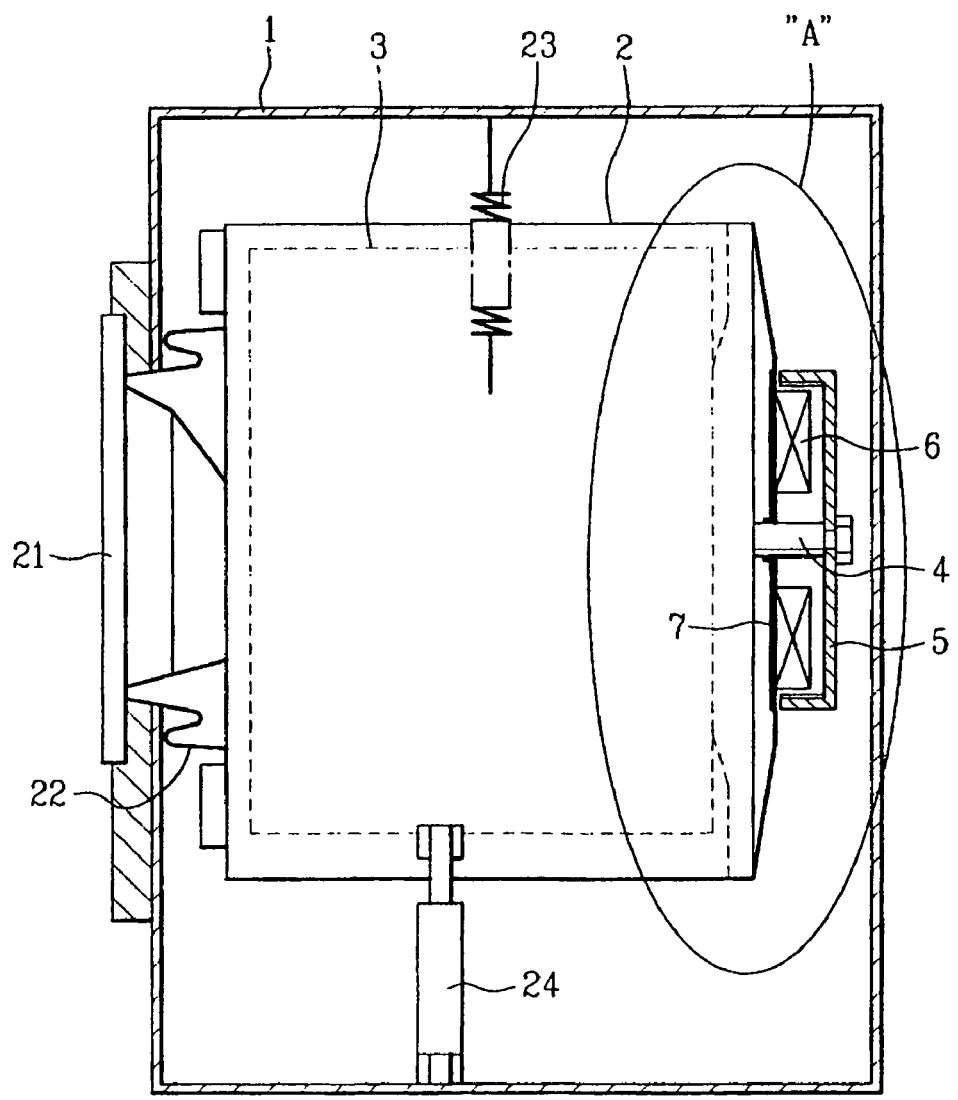
FIG. 5 illustrates a longitudinal section of a direct drive, drum type washing machine in accordance with a preferred embodiment of the present invention, schematically.
Figure 6:
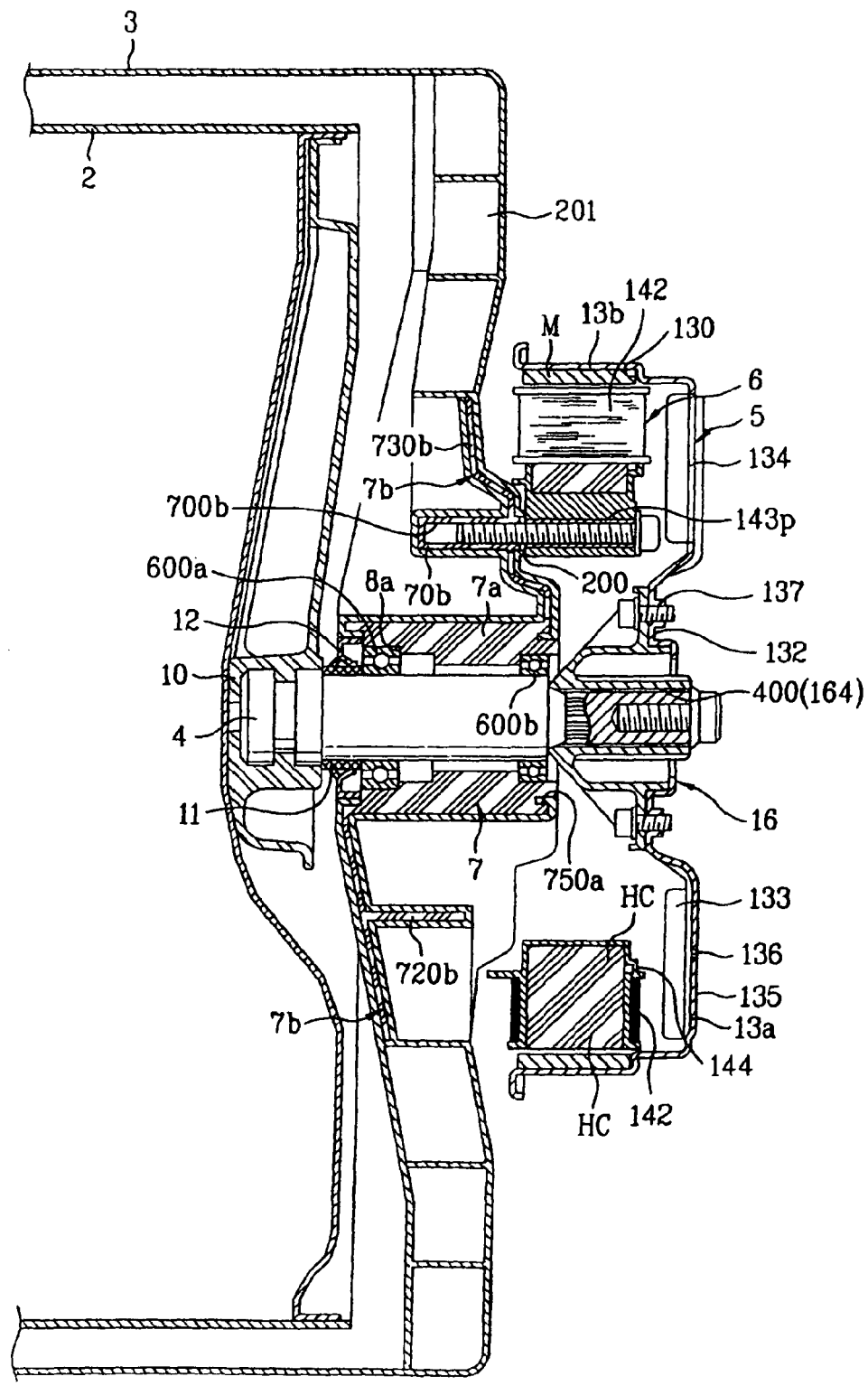
FIG. 6 illustrates an enlarged longitudinal sectional view of an 'A' part in FIG. 5 of the drum type washing machine of the present invention.

FIG. 5 illustrates a longitudinal section of a direct drive, drum type washing machine in accordance with a preferred embodiment of the present invention schematically, and FIG. 6 illustrates an enlarged longitudinal sectional view of an 'A' part in FIG. 5 of the drum type washing machine of the present invention.

Figure 7:
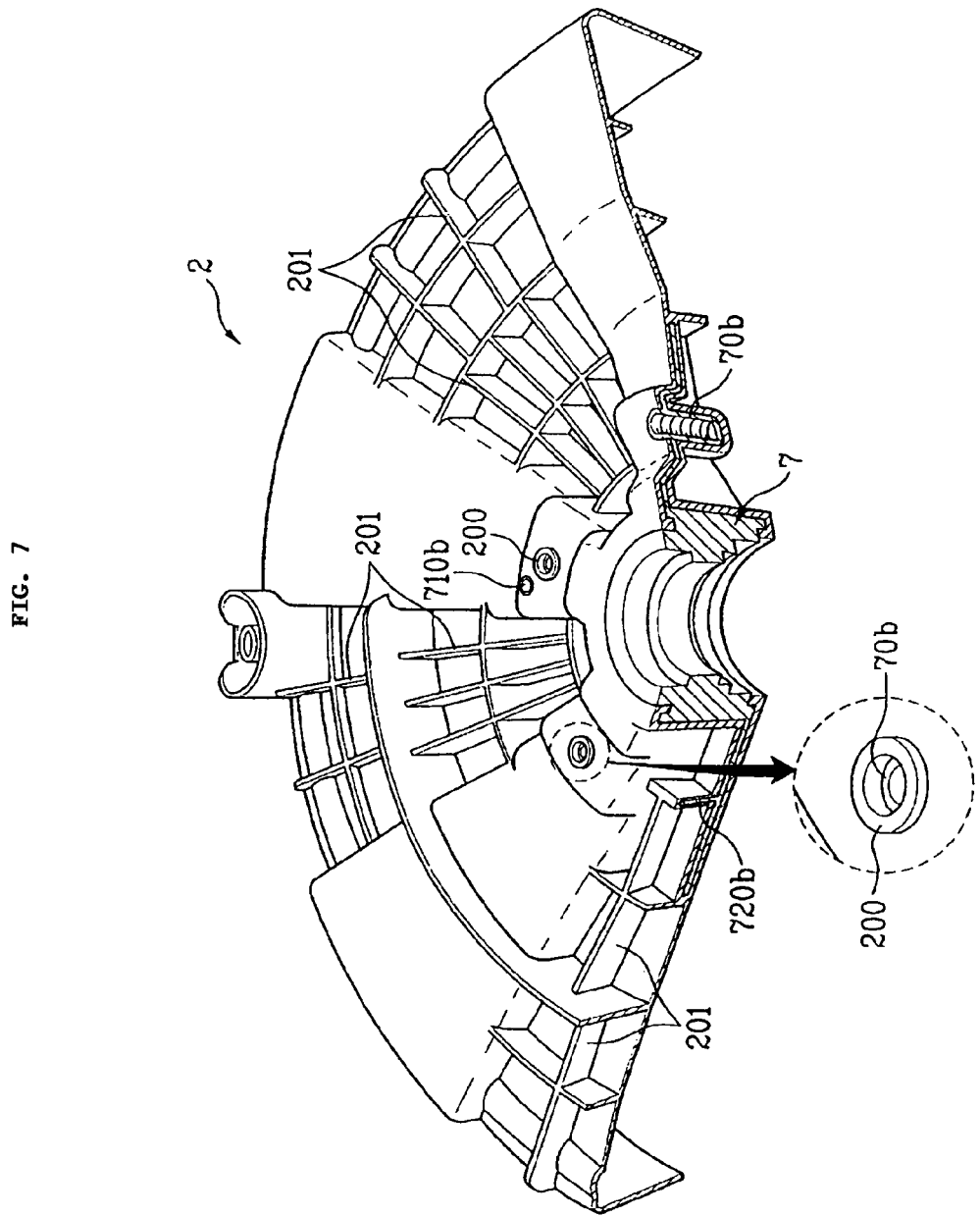
FIG. 7 illustrates a cut away perspective view of a tub rear wall.
Figure 8:
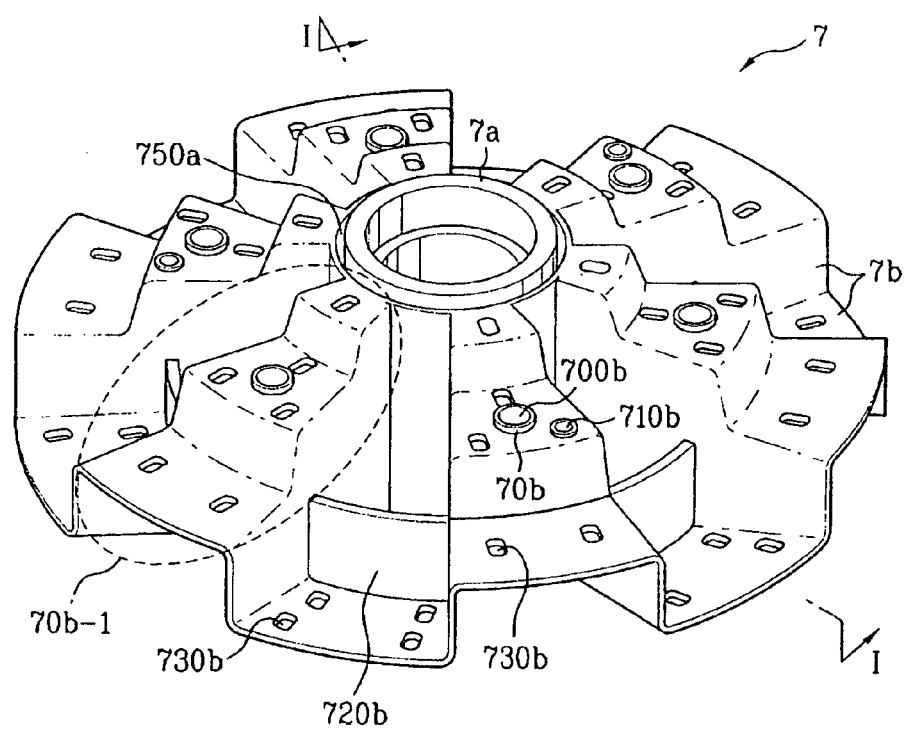
FIG. 8 illustrates a perspective view of the unitary bracket and bearing housing in FIG. 6.
Figure 9:
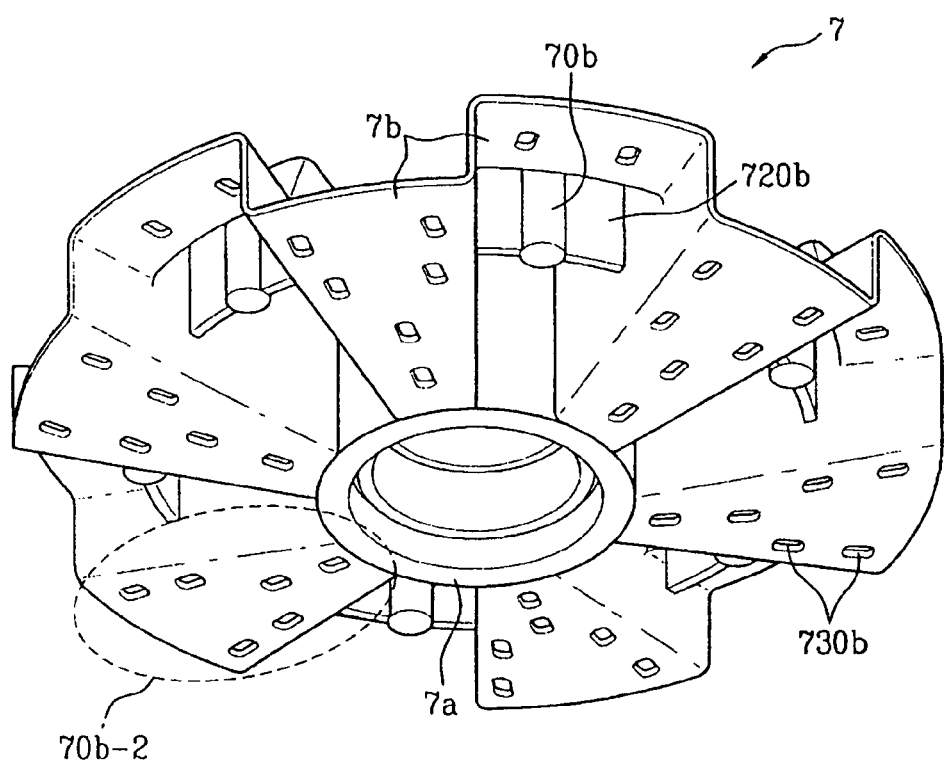
FIG. 9 illustrates a backside perspective view of FIG. 8.
Figure 10:
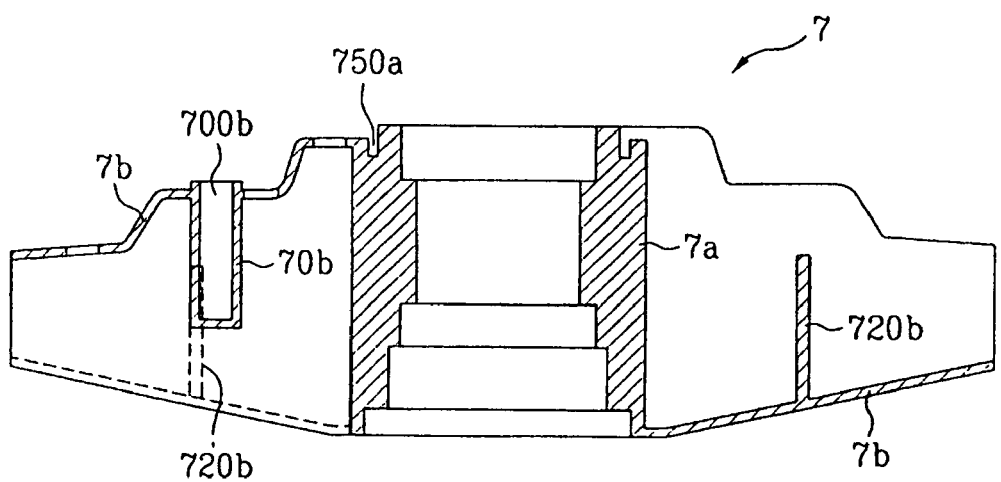
FIG. 10 illustrates a section across a line I-I in FIG. 8.

FIG. 7 illustrates a cut away perspective view of a tub rear wall, FIG. 8 illustrates a perspective view of the unitary bracket and bearing housing in FIG. 6, FIG. 9 illustrates a backside perspective view of FIG. 8, and FIG. 10 illustrates a section across a line I-I in FIG. 8.

Figure 11:
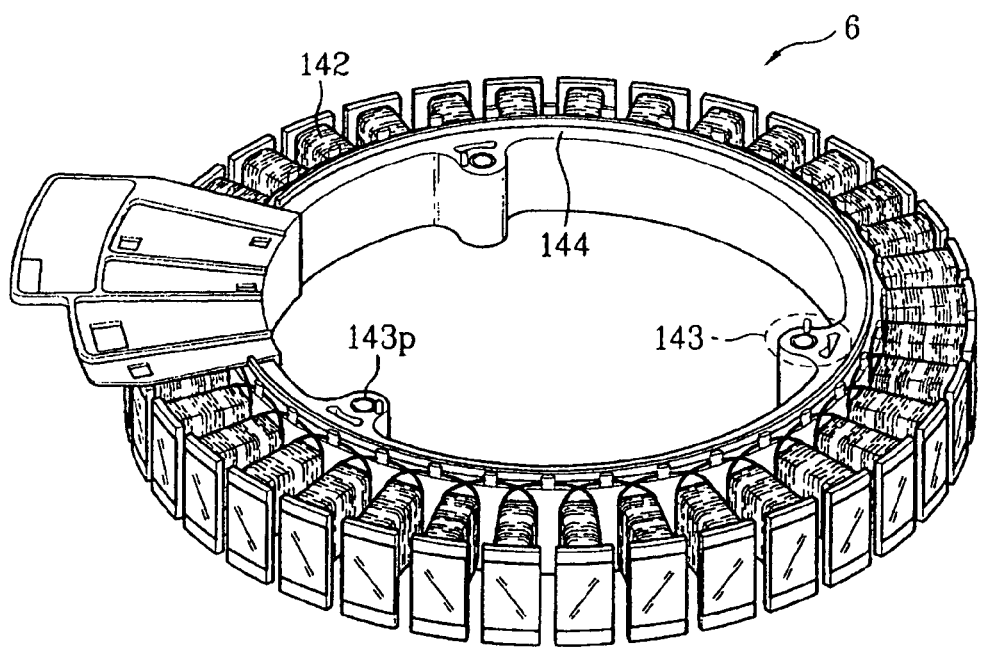
FIG. 11 illustrates a perspective view of the stator in FIG. 6.
Figure 12:
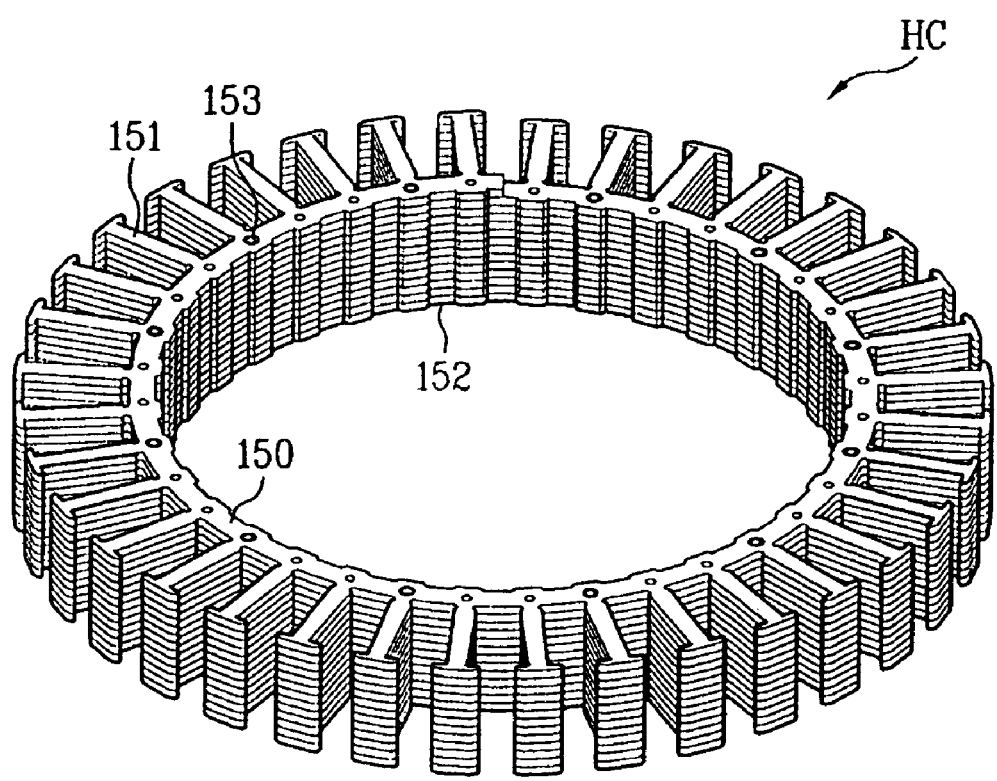
FIG. 12 illustrates a perspective view of the helical type core in FIG. 11.
Figure 13A:
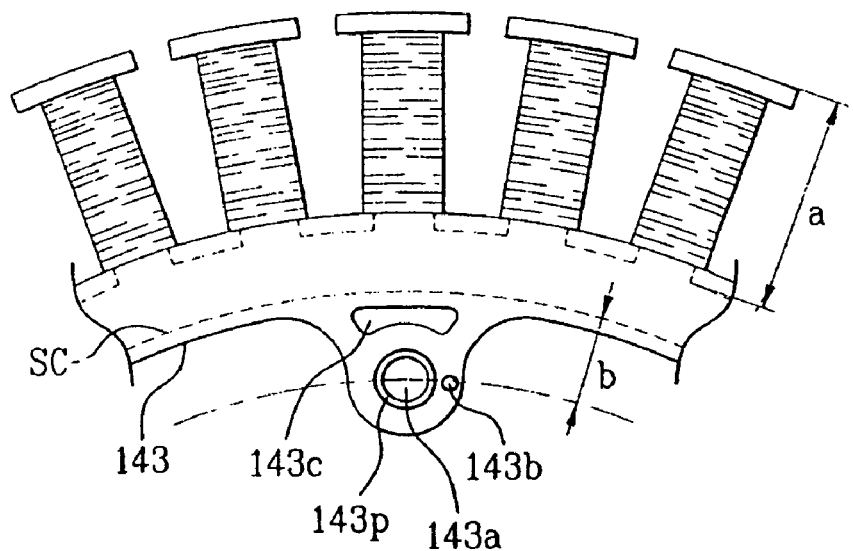
FIG. 13A illustrates a plan view of key parts of the stator in FIG. 11.
Figure 13B:
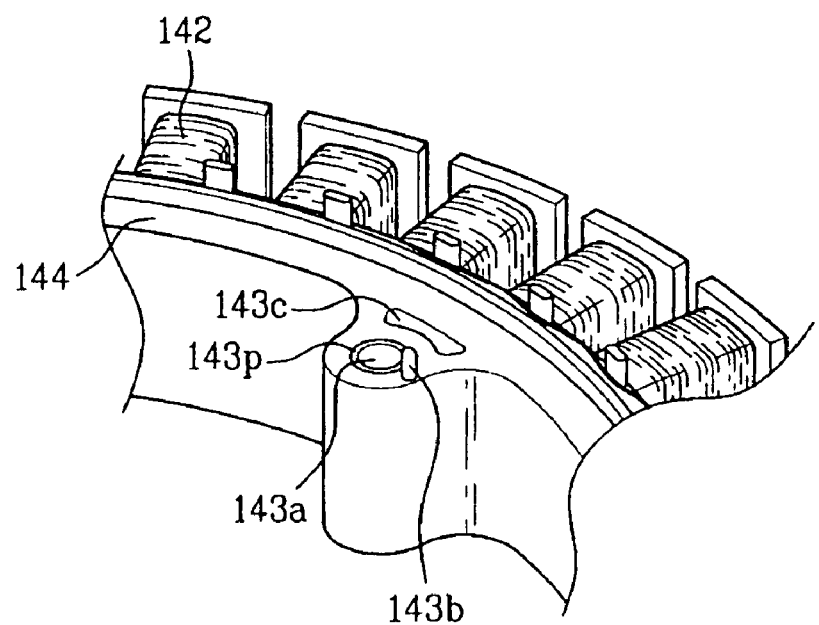
FIG. 13B illustrates a perspective view of key parts of the stator in FIG. 11.

FIG. 11 illustrates a perspective view of the stator in FIG. 6, FIG. 12 illustrates a perspective view of the helical type core in FIG. 11, FIG. 13A illustrates a plan view of key parts of the stator in FIG. 11, and FIG. 13B illustrates a perspective view of key parts of the stator in FIG. 11.

The drum type washing machine of the present invention, having a tub 2 inside of a cabinet 1 for holding washing water, with a wall for fixing a driving part thereto, a drum 3 inside of the tub 2, a shaft 4 connected to the drum with a shaft for transmission of a driving power from a motor to the drum 3, and a bearing for supporting the shaft 4, wherein the tub 2 is formed of a plastic, and includes a metal bearing housing 7 at a central part of a rear wall of the tub 2 both for supporting the bearings at both ends of an outside circumferential surface of the shaft 4 and fastening the stator 6.

The bearing housing 7 is formed of an aluminum alloy and the like, and integrated with the tub rear wall by inserting the bearing housing 7 in a mold in an injection molding of the tub 2 of plastic.

In the meantime, referring to FIG. 6, the bearing housing 7 includes a bearing supporting part 7a of a sleeve form for supporting the bearings, a stator fastening part 7b formed as a unit with the bearing supporting part 7a extended form a rear end of the bearing supporting part 7a in a radial direction, and stator fastening holes 700b in the stator fastening part 7b, wherein both the bearing supporting part 7a and the stator fastening part 7b are inserted in the tub 2 rear wall, when only the stator fastening holes 700b are exposed.

Referring to FIGS. 8 and 9, the stator fastening part 7b, extended from the sleeve form of bearing supporting part 7a in the radial direction outwardly, includes stepped areas 70b-1 each having at least one step in the outward extension in a direction of the outward extension, and flat areas 70b-2 each between adjacent stepped areas 70b-1, wherein the stepped areas 70b-1 and the flat areas 70b-2 are connected to each other, respectively.

That is, the stator fastening part 7b includes the stepped areas 70b-1 each having steps as the stepped area 70b-1 extends in an outward radial direction, and flat areas 70b-2 between the stepped areas 70b-1, wherein each of the areas 70b-1 extended from an upper end of the bearing supporting part 7a in the outward radial direction is bent down at preset intervals as the stepped area 70b-1 extends in the outward radial direction, and each of the areas 70b-2 connected to a lower end of the bearing housing 7 is flat.

There is a resin stuffing groove 750a around the upper part of the bearing housing 7 for enhancing a bonding force with the tub 2 in the insert injection molding.

Referring to FIGS. 7 and 8, there is a positioning hole 710b formed adjacent to a stator fastening hole 700b of the stator fastening part 7b in correspondence to a positioning projection on the stator 6.

Referring to FIG. 7, there is a boss 200 at a part of the tub rear wall opposite to each of the stator fastening holes 700b for preventing the stator fastening part 7b from coming into direct contact with the stator 6, thereby preventing an insulator of the stator 6 from being broken due to a fastening force applied thereto in mounting the stator 6.

It is also preferable that the stator fastening part 7b has a circumferential rib 720b at a position spaced a distance from an axis of the bearing supporting part 7a for increasing a bonding force with the plastic in the injection molding of the tub 2. Though it is preferable that there are fastening bosses 70b each with a stator fastening hole 700b on the rib 720, it is not necessarily required to form the fastening holes 700b on the rib 720b.

In addition to this, there are circumferential and radial reinforcing ribs 201 on a region excluding the bearing housing stepped area of the tub rear wall for reinforcing the tub rear wall.

In the meantime, different from the foregoing stator fastening part 7b, the stator fastening part 7b may be an extension from the sleeve form of the bearing supporting part 7a the same with the foregoing stator fastening part 7b, but separated at regular intervals in a circumferential direction to form a plurality of separated radial segments.

Referring to FIGS. 6 and 7, the bearing housing 7 of metal has a step 8a in an inside circumferential surface for supporting, and preventing the bearings 600a on the inside circumferential surface from breaking away from the bearing housing 7.

A front part of the shaft 4 is fixed to a spider 10 in a rear wall of the drum 3, and a section of the shaft 4 from an exposed part in rear of the spider 10 to a front bearing 600a has a brass bushing 11 press fit thereon for preventing the shaft 4 from rusting, with a sealing member 12 fitted on an outside surface of the bushing 11 for preventing infiltration of water toward the bearing.

The shaft 4 has the rotor 5 of the direct drive motor mounted at a center of rear end thereof, on an inner side of which the stator 14 is positioned, that is mounted on the tub rear wall to form the direct drive motor together with the rotor 5.

Referring to FIG. 6, the rotor 5, formed of steel plate, has a circumferential bent part with a seating surface 130 for seating magnets M placed on an inside surface of a side wall 13b extended forward from an edge of a rear wall of the rotor 5, and a hub 132 in a center part of the rear wall 13a having through holes for passing fastening members 15a, such as bolts, in mounting the rotor 5 on the shaft 4.

It is preferable that the rotor 5 is formed by pressing.

The rotor 5 has a plurality of radial cooling fins 133 around the hub 132 for blowing air toward the stator 6 when the rotor 5 rotates, to cool down heat from the stator 6. Each of the cooling fins 133 has a length in the radial direction.

The cooling fin 133 is formed by lancing to be bent at 90° from the rear wall to direct an opened side of the rotor 5, and a through hole 134 formed in the lancing serves as an air hole.

The rotor 5 has embossing 135 between adjacent cooling fins 133 of the rear wall 13a for reinforcing the rotor 5, and drain holes 136 in the embossing 135.

The rotor 5 has fastening holes 137 for fastening a connector 16 engaged with a rear end part of the shaft 4 in rear of a rear bearing 600b by means of serration, and positioning holes 138 for positioning the connector in mounting the connector on the shaft 4, both of which fastening holes 137 and positioning holes 138 are formed around the through hole 131 in the hub 132 at regular intervals.

The connector 16 is formed of plastic having a vibration mode different from the rotor 5 of steel plate, and serves as a bushing for the rotor, too. The connector 16 has serration 164 fit to the serration 400 in the rear end part of the shaft 4.

The tub rear wall has a hub part for putting the bearing supporting part 7a of the bearing housing 7 therein in the injection molding of the tub 2.

According to this, the present invention permits to dispense with the tub supporter which is essential in the related art, to reduce assembly man power in an assembly line, and improve a productivity.

That is, the present invention permits to dispense with the tub supporter, which is a separate part having an almost same outside shape with the tub rear wall, fixed to, and holds the tub rear wall in mounting the stator 6, and maintains a concentricity of the stator 6.

Referring to FIG. 11, the stator 6 includes a helical type core HC, an insulator 144 having the helical type core HC encapsulated therein, a coil wound around tooth portions 151 of the helical type core HC, and fastening parts 143 molded as a unit with the insulator 144 projected toward an inside of the helical type core HC from three, or more than three places, and in general weighs more than 1.5 kg as the capacity of the drum type washing machine becomes larger.

The helical type core HC has multiple layers formed by winding a steel plate having the tooth portions and the base part in a helix starting from a bottom layer to a top layer, with the tooth portions 151 projected outwardly in a radial direction from the base part. The base part 150 has recesses 152 for reducing stress in the winding of the helical type core.

The multiple layers of the helical type core HC are fastened with rivets 153 passed through through holes in the base part 150. A starting part and an end part of the helical type core HC may be welded at the base parts 150 in contact thereto. The recess 152 in the base part 150 may be rectangular, trapezoidal, or an arc.

Referring to FIGS. 13A and 13B, in the stator 6 having three or more than three fastening parts 143 formed as a unit with the insulator so as to be projected in a radial direction toward inside from the inside circumferential surface of the helical type core, each of the fastening parts 143 is formed to meet a condition of $a \geqq b$, where "a" denotes a length of the tooth portion 151 from an outer edge of the base part 150, and "b" denotes a distance from an inner edge of the base part 150 to a center of the fastening hole 143a.

The fastening part 143 has a height greater than 20% of a total core stack height, and preferably equal to the total core stack height.

The fastening part 143 has at least one cavity 143c for damping vibration at the time of motor driving, and a positioning pin 143b fit to the positioning hole 710b in the stator fastening part exposed in a state inserted in the tub rear wall.

In the meantime, there is a metal tube 143p or a spring pin forcibly inserted in the fastening hole 143a of the fastening part 143.

The operation of the driving part of the drum type washing machine of the present invention will be described.

Under the control of a controller (not shown) attached to a panel for driving the motor, if current flows to the coils 142 in the stator 6 in succession, to rotate the rotor 5, the shaft 4 engaged with the connector 16 having the rotor 5 fixed thereto by means of serration rotates. According to this, the power is transmitted to the drum 3 through the shaft 4, to rotate the drum 3.

In the meantime, performance of the foregoing drum type washing machine will be described.

At first, since the tub 2 is formed of a heat resistant plastic, the tub 2 is light, and since the tub 2 is injection molded, the tub 2 is easy to fabricate.

Since the bearing housing 7 is formed of a metal, such as an aluminum alloy, which shows little thermal deformation even at a high temperature, the bearing housing 7 can be used in the drum type washing machine having the spinning cycle.

Since the bearing housing 7 of metal is inserted in the hub of the tub rear wall at the time of injection molding of the tub 2 of plastic, to form an integrated type tub 2 and bearing housing 7, that permits to dispense with the additional process of mounting the bearing housing 7 on the tub rear wall, thereby simplifying the assembly process, and reduce an assembly man power.

Referring to FIG. 12, the recess 152 in the base part 150 of the stator 6 reduces a stress in winding the core, thereby permitting an easy and small power winding.

Especially, referring to FIG. 13A, in the stator 6 having three or more than three fastening parts 143 formed as a unit with the insulator so as to be projected in a radial direction toward inside from the inside circumferential surface of the helical type core, each of the fastening parts 143 is formed to meet a condition of $a \geqq b$, where "a" denotes a length of the tooth portion 151 from an outer edge of the base part 150, and "b" denotes a distance from an inner edge of the base part 150 to a center of the fastening hole 143*a*.

The condition is set taking a case into account, in which, even though the closer the position of the fastening hole 143*a* to a point a load exerts thereon, the better in view of reduction of a torque, the position of the fastening hole 143*a* set at a position close excessively to the point a load exerts thereon leads to a bolt of smaller diameter, to require an excessively many number of bolts.

Referring to FIG. 13B, the fastening part 143 has a height greater than 20% of a total core stack height, otherwise the fastening part 143 is liable to break due to vibration caused by motor driving. Especially, the fastening par 143 may have a height equal to or higher than the total core stack height.

However, because an excessively high fastening part 143 increases a total width of the driving part, and reduces a washing capacity of the washing machine, the height of the fastening part 143 is limited not to exceed two times of the total core stack height.

The cavity 143*c* in the fastening part 143 dampens vibration at the time of motor driving, to improve mechanical reliability of the stator 6.

The positioning pin 143*b* on the fastening part 143 fits to the positioning hole 710*b* in the tub 2, thereby permitting an easy mounting of the stator 6 on the tub 2.

The sleeve form of bearing supporting part 7*a* for supporting bearings fitted therein, and the stator fastening part 7*b* for fastening the stator 6 thereto, of the bearing housing 7, both of which are formed as a unit, can dispense with the related art tub supporter.

The boss 200 at a part of the tub rear wall opposite to each of the stator fastening holes 700*b* prevents the stator fastening part 7*b* from coming into direct contact with the stator 6, thereby preventing the insulator of the stator 6 from being broken due to a fastening force applied thereto in mounting the stator 6.

The stepped areas 70*b*-1 each having steps at preset intervals as the stepped area 70*b*-1 extends in an outward radial direction of the cylindrical bearing supporting part 7*a*, and the flat areas 70*b*-2 between adjacent stepped areas 70*b*-1 and connected to the stepped areas 70*b*-1 in a circumferential direction with flat parts perpendicular thereto permit to increase bonding force to the tub 2 in the injection molding of the tub 2.

In addition to this, the circumferential rib 720*b* at a position spaced a distance from an axis of the bearing supporting part 7*a* also increases a bonding force with the plastic in the injection molding of the tub 2.

Moreover, the through holes 730*b* in the stator fastening part 7*b* increases the bonding force with the plastic in the insert injecting molding of the bearing housing 7.

The fastening boss 70*b* with the stator fastening hole 700*b* in the bearing housing 7 can dispense with formation of fastening holes in the tub 2, additionally.

That is, according to the present invention, the stator 6 is fastened to the stator fastening holes 700*b* in the fastening boss 70*b* of the stator fastening part 7*b* buried in the tub rear wall with bolts.

The positioning hole 710*b* formed adjacent to the stator fastening hole 700*b* of the stator fastening part 7*b* in correspondence to a positioning projection on the insulator of the stator 6 improves workability in mounting the stator 6 on the tub rear wall.

Of course, the positioning hole 710*b* in the stator fastening part 7*b* is formed, not covered with plastic, but exposed, and in a case the positioning hole is formed in the insulator, the positioning projection will be formed on the stator fastening part 7*b*.

Since the front end of the shaft 4 is fixed to the spider 10 in the rear wall of the drum 3, and a section of the shaft 4 from a part exposed to an outside of the spider 10 to the front bearing 600*a* has the brass busing 11 forcibly press fit thereon, rusting of the shaft 4 is prevented.

The sealing member 12 on the outside surface of the bushing 11 prevents infiltration of water toward the bearing.

The circumferential bent part with a seating surface 130 for seating magnets M placed on an inside surface of a side wall 13*b* extended forward from an edge of a rear wall of the rotor 5 permits an easy fabrication of the rotor since the seating surface 130 supports the magnet M easily when the magnet M is attached to the inside surface of the rotor 5.

The hub 132 in a center part of the rear wall 13*a* having through holes 131 permits to pass fastening members 15*a*, such as bolts, in mounting the rotor 5 on the shaft 4, and the plurality of radial cooling fins 133 each with a length permits blowing of air toward the stator 6 to cool heat from the stator 6 when the rotor 5 rotates.

The cooling fin 133 is formed by lancing to direct an opened side of the rotor 5, and a through hole 134 formed in the lancing serves as an air hole.

The rotor 5 formed of steel plate by pressing reduces a time period required for fabrication of the rotor 5, and improves productivity.

The embossing 135 between adjacent cooling fins 133 on the rear wall 13*a* of the rotor 5 improves an overall strength of the rotor 5, and the drain hole 136 in the embossing 135 permits to discharge water through the drain hole 136.

The connector 16, formed by a plastic injecting molding, has a vibration mode different from a vibration mode of the rotor 5 of steel plate, to attenuate vibration transmitted from the rotor 5 to the shaft 4.

The serration 164 in the inside circumferential surface of the hub of the connector 16 engaged with the serration 400 in the rear end part of the shaft 4 enables transmission of a rotation power from the rotor 5 to the shaft 4 through the connector 16 as it is.

Figure 14:
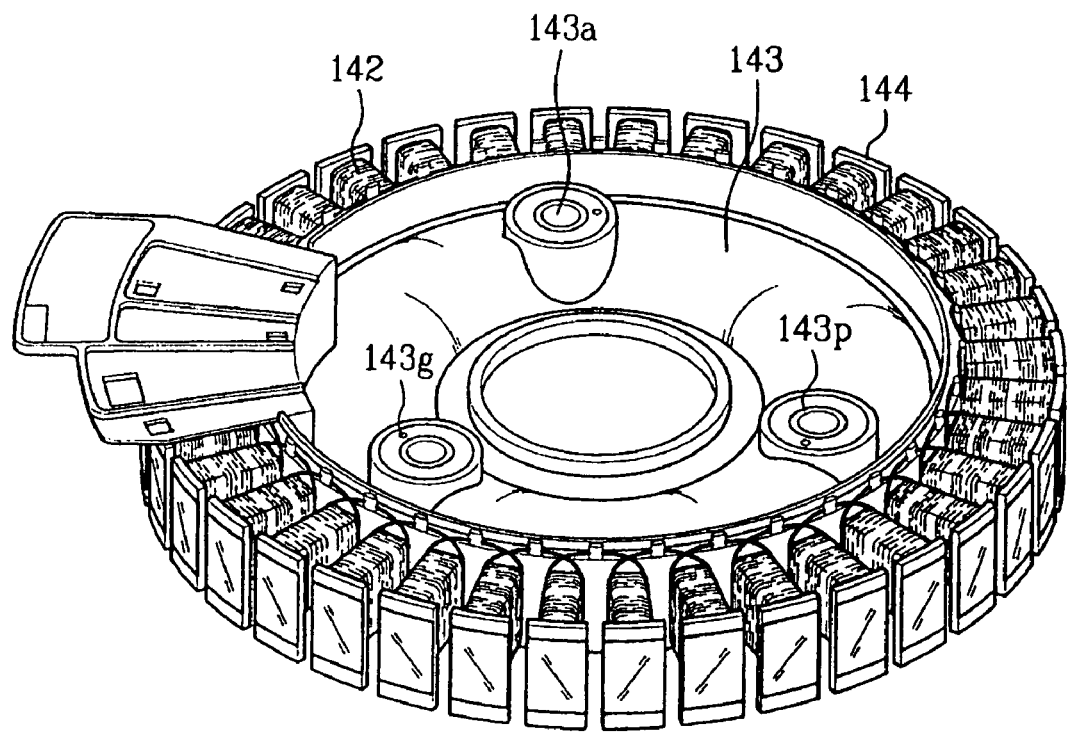
FIG. 14 illustrates a perspective view of a stator in a driving part of a drum type washing machine in accordance with another preferred embodiment of the present invention.

FIG. 14 illustrates a perspective view of a stator in a driving part of a drum type washing machine in accordance with another preferred embodiment of the present invention.

Referring to FIG. 14, the stator 6 of the present invention includes a helical type core HC, an insulator 144 having the helical type core HC encapsulated therein, a coil wound on tooth portions 151 of the helical core HC, and fastening parts 143 formed as a unit with the insulator 144 so as to be projected toward an inside of the helical type core HC.

That is, the stator 6 in the embodiment has, not a structure in which the fastening parts are projected in a radial direction toward an inside of the helical type core HC from more than three positions, but a structure in which the fastening parts form a unit with the insulator 144 extended in a radial direction toward an inside of the helical type core HC.

Alike the foregoing embodiment, the helical type core HC has multiple layers formed by winding a steel plate in a helix starting from a bottom layer to a top layer, with a plurality of tooth portions 151 projected outwardly in a radial direction from a base part 150 of the helical type core HC, and recesses 152 in the base part 150 for reducing a stress in winding the helical type core HC.

There is a positioning hole 143*g* adjacent to the fastening hole 143*a* in the fastening part 143, if there is a positioning pin on the tub rear wall, for fitting in mounting the stator. Opposite to this, of course, the positioning pin may be formed adjacent to the fastening hole 143a, and the positioning hole may be formed in the tub rear wall.

Other parts and performances thereof of the embodiment are the same with the foregoing embodiment, of which repetitive descriptions are omitted.

In the meantime, the present invention is not limited to above embodiments, it is of course possible that dimensions, shapes, and materials may be changed as far as the changes do not depart from the spirit or scope of the invention.

For an example, the stator fastening part 7b may only have an outward radial direction extension from the cylindrical bearing supporting part 7a with stepped areas 70b-1 at preset intervals along a radial direction. Or, alternatively, the stator fastening part 7b may have alternate outward radial direction extensions from front part and rear part of the cylindrical bearing supporting part 7a in a circumferential direction connected at edges of the extensions substantially perpendicular to the extensions, without the stepped areas.

Figure 15:
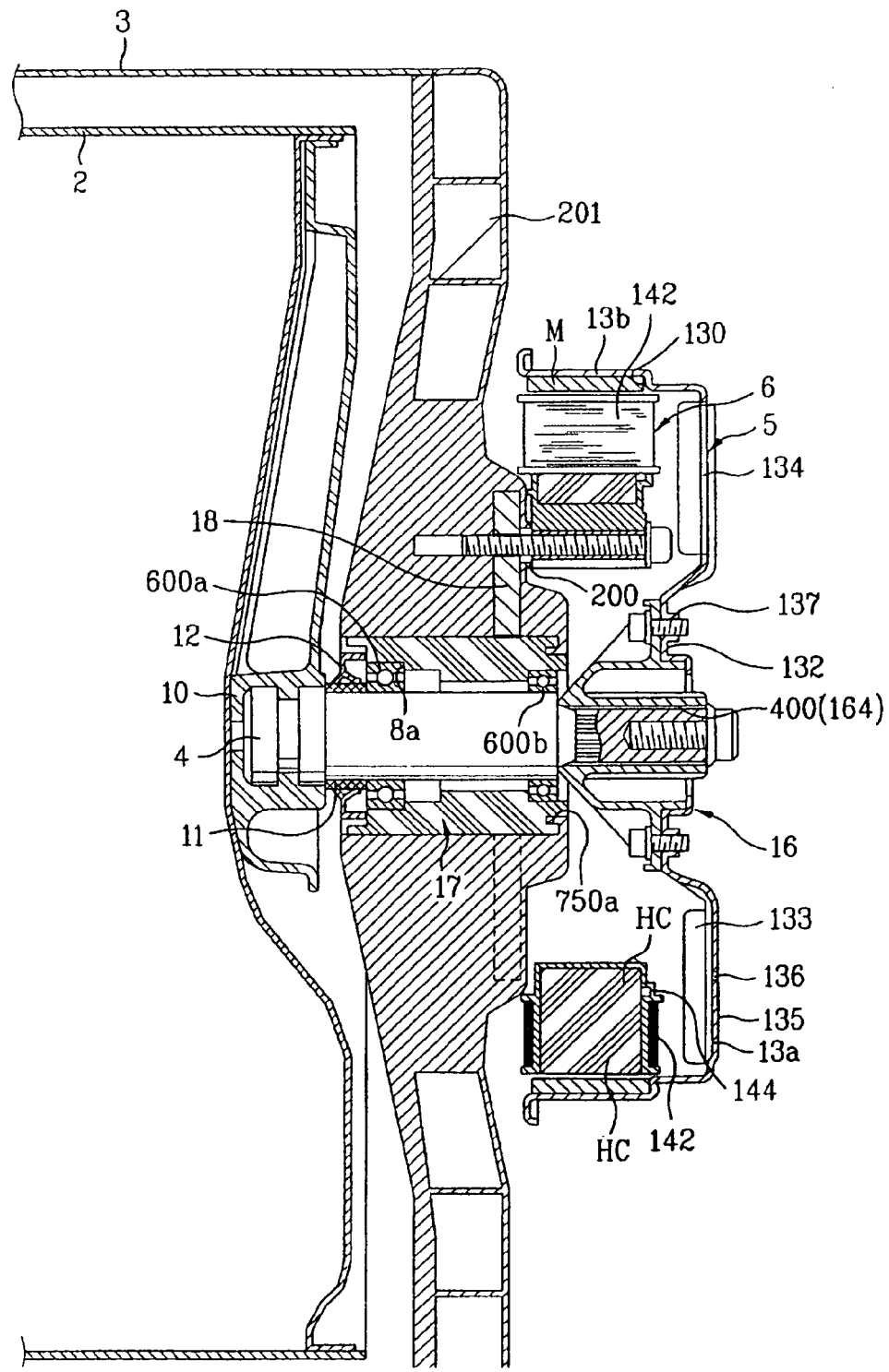
FIG. 15 illustrates a longitudinal section of a drum type washing machine in accordance with another preferred embodiment of the present invention.

FIG. 15 illustrates a longitudinal section of a drum type washing machine in accordance with another preferred embodiment of the present invention.

Referring to FIG. 15, the drum type washing machine includes a tub 2 having a wall for holding washing water therein and mounting a driving part thereon, and a sleeve form of bearing supporting part 17 for supporting bearings, in which both the tub 2 and the bearing supporting part 17 are formed as one unit, a drum 3 rotatably arranged inside of the tub 2, a shaft 4 passed through the tub 2 and connected to the drum 3 for transmission of a driving power from a motor to the drum, at least one bearing 600a inside of the bearing supporting part 17 for supporting the shaft 4, a rotor 5 engaged to a rear end part of the shaft 4 to form the motor together with the stator 6, and the stator 6 mounted on the tub 2 on an inner side of the rotor 5 and an outer side of the bearing supporting part 17 with fastening members. The stator includes an annular helical type core HC having multiple layers formed by winding a steel plate having tooth portions 151 and base part in a helix starting from a bottom layer to a top layer, an insulator having the helical type core HC encapsulated therein, a coil wound on the tooth portions 151, and fastening parts formed as a unit with the insulator 144, having fastening holes projected toward an inside of the helical type core HC for fastening to the bearing supporting part 17.

Of course, there are a plurality of fastening holes in an outer region of the bearing supporting part 17 of the tub 2 for mounting the stator 6 of motor with fastening members. There is a metal tube 143p or a spring pin forcibly inserted in the fastening hole 143a of the fastening part 143.

Both the tub 2 and the bearing supporting part 17 may be formed by plastic injection molding, or the tub 2 may be formed of plastic, and the bearing supporting part 17 may be formed of a metal, such as an aluminum alloy.

More preferably, in the plastic injection molding of the tub 2, the tub 2 is injection molded in a state a tub supporting plate 18 of a metal formed as a separate piece from the bearing supporting part is buried in an outer region of the bearing supporting part 17.

Other parts not described herein are the same with the foregoing embodiment, and repetitive description of which will be omitted.

The performance of the embodiment will be described.

When a current flows to the stator 6, to rotate the rotor 5, the shaft 4 connected to the rotor 5 rotates. The shaft 4 rotates supported on a front bearing 600a and a rear bearing 600b inside of the bearing supporting part 17.

That is, a load on the shaft 4 is transmitted to the front, and rear bearings 600a, and 600b, and, therefrom, to the bearing supporting part 17. Since the bearing supporting part 17 is formed as a unit with the tub rear part, the bearing supporting part 17 can support the shaft 4, more stably.

The tub supporting plate 18 of a metal formed as a separate piece from the bearing supporting part, and buried in an outer region of the bearing supporting part 17 in the injection molding of the tub 2 permits to dispense with a separate reinforcing liner attached to the tub rear wall, enough to secure a supporting force for the stator 6 mounted on the tub rear wall even if the BLDC motor is mounted on the tub wall directly.

The drum type washing machine of the present invention has the following advantages.

First, the direct drive type motor reduces noise, out of order, and power loss, and the bearing housing of a metal can be applied to a product with a drying function, as the bearing housing has no thermal deformation.

Second, the rotor 5 of a steel plate formed by pressing reduces a fabrication time period, and improves a productivity.

Third, the helical type core permits to reduce waste of material, easy fabrication, and increase a rigidity of the fastening part of the stator 6 to reduce noise and vibration, and improve mechanical reliability, and a lifetime.

Fourth, the difference of vibration modes of the rotor and the connector permits to reduce vibration transmitted from the rotor to the shaft, and the stator fastening part 7b permits rigid mounting of the stator 6 on the tub rear wall, and maintenance of concentricity of the stator 6, without damage of the tub rear wall.

Fifth, the elimination of tub supporter fitting work from the assembly line permits to simplify an assembly process, and easy maintenance by a serviceman in repair and replacement of component.

Sixth, even if the BLDC motor with a net stator weight over 1.5 kg, and a rotation speed varied in a range of 0-2000 RPM, or over is mounted on the tub wall directly, the tub rear wall can support the stator, securely.

Referring to FIGS. 16 to 19, a bearing housing 7 of metal material is inserted into a rear wall of a tub according to the present invention. The tub 2 is injection-molded by injecting plastic melt thereto after inserting the bearing housing into the tub 7.

A recessing part 120 and 220 and a projecting part 110 and 210 are formed on an inner surface or an outer surface of the rear wall of the tub 2. According to this embodiment of the present invention, the projecting part 110 of the outer surface of the rear wall is corresponding with the recessing part 220 of the inner surface thereof, whereas the recessing part 120 of the outer surface thereof is corresponding with the projection part 210 of the inner surface thereof. That is, the rear wall of the tub 2 has an embossing appearance formed along a circumferential direction. The above embossing appearance may enable the rear wall of the tub 2 to secure enough strength and rigidity, even though the rear wall is not so thick.

The bearing housing 7 inserted into the rear wall of the tub 2 has a flange part 8. The flange part 8 is also insertedly formed in an embossing appearance corresponding with the embossing appearance of the rear wall of the tub 2.

The circumferential ribs 121, 122, 123 and 124 and a radial rib 125 are crossed on the recessing part 120 of the outer surface of the rear wall of the tub. Also, the circumferential ribs 221, 222, 223 and 224 and the radial rib 225 are crossed on the recessing part 220 of the inner surface of the rear wall.

The circumferential ribs 121 and 221 nearest to the center of the rear wall of the tub 2 are thicker than the other circumferential ribs.

Here, a circumferential rib 81 is formed on the recessing part of the flange part 8 of the bearing housing 7, corresponding with the circumferential ribs 121-124 and 221-224 of the tub 2. The circumferential rib 81 of the flange part 8 is inserted into the circumferential rib 121 and 221 nearest to the center of the tub 2.

Moreover, a boss 131 is formed on the rear wall of the tub 2 for fastening a stator 6 of a motor. The boss 131 is provided in the circumferential rib 81 of the flange part 8, and a hole of the boss 131 is exposed to the projecting part 110 of the outer surface of the rear wall.

The circumferential rib 121 and 221 nearest to the center out of the circumferential ribs 121-124 and 221-224 is provided in the same circumference as the circumference of the boss 131, such that the stator 6 fastened to the boss 131 is supported securely.

Figure 16:
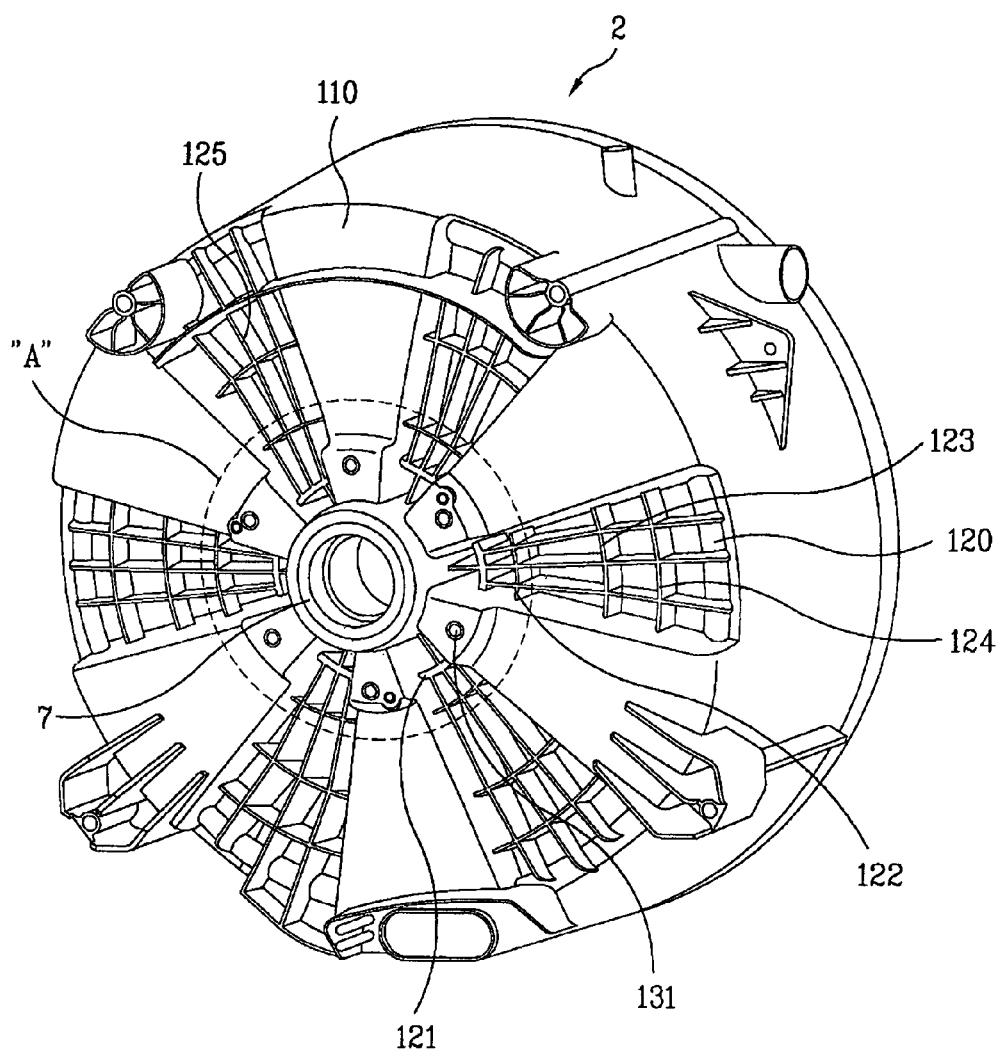
FIG. 16 is a diagram illustrating an outer surface of a rear wall of a tub according to the present invention.
Figure 17:
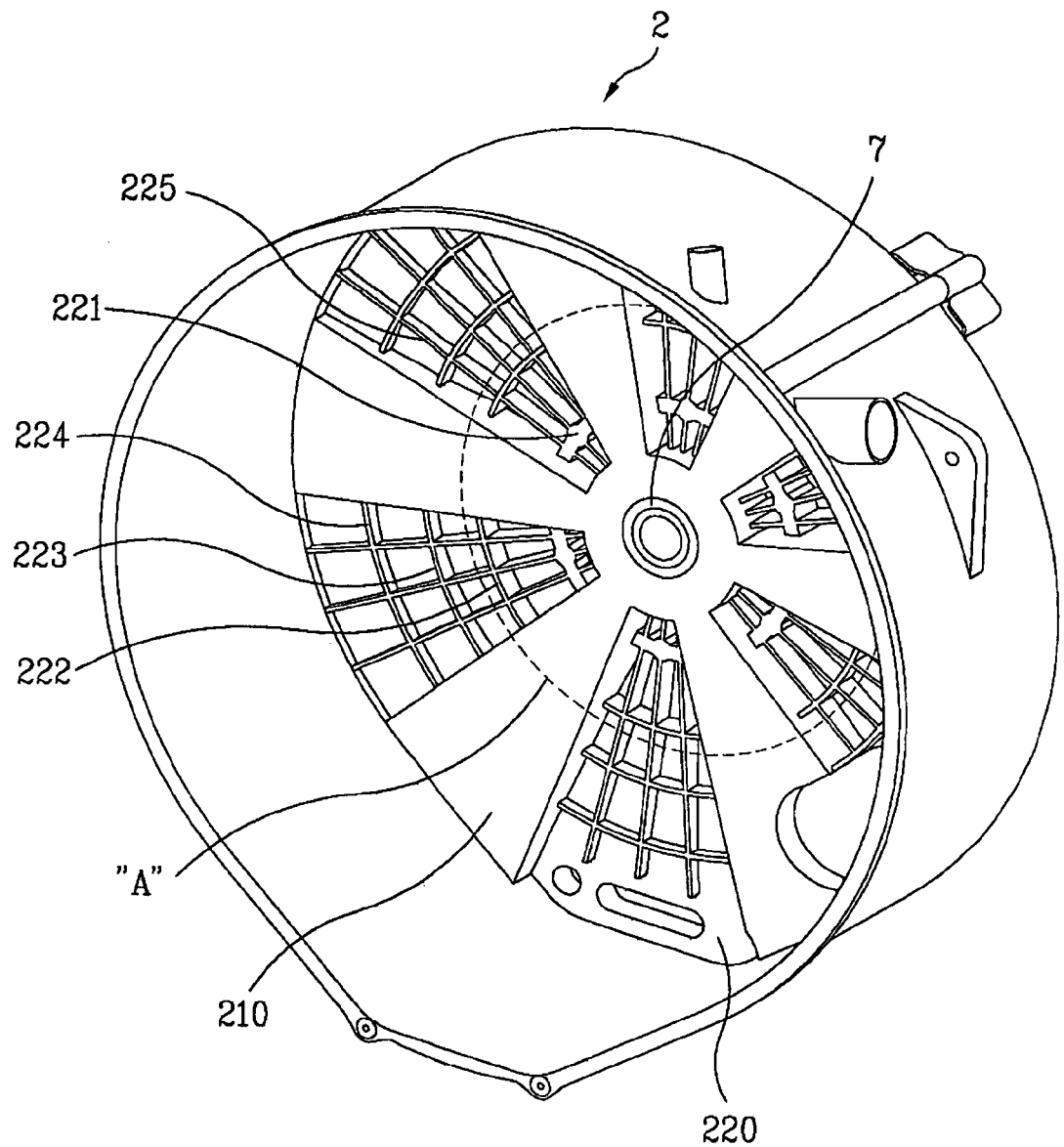
FIG. 17 is a diagram illustrating an inner surface of the rear wall of the tub in FIG. 16 according to the present invention.

The circumferential ribs 121-124 and 221-224 of the recessing part 120 of the rear wall are spaced apart from an outer end of the flange part 8 in a radial direction. A circumference referenced to as a dotted line 'A' in FIGS. 16 and 17 is the portion where the outer end of the flange part 8 of the bearing housing 7 is positioned, and the circumferential ribs 121~124 and 221~224 are not on the circumference, but spaced apart from the outer end of the flange part. Thus, stress is prevented from being concentrated only on some part enough to cause crack, because the circumferential ribs 121~124 and 221~224 are not provided in the same position of the circumference of the outer end of the flange part 8.

Figure 18:
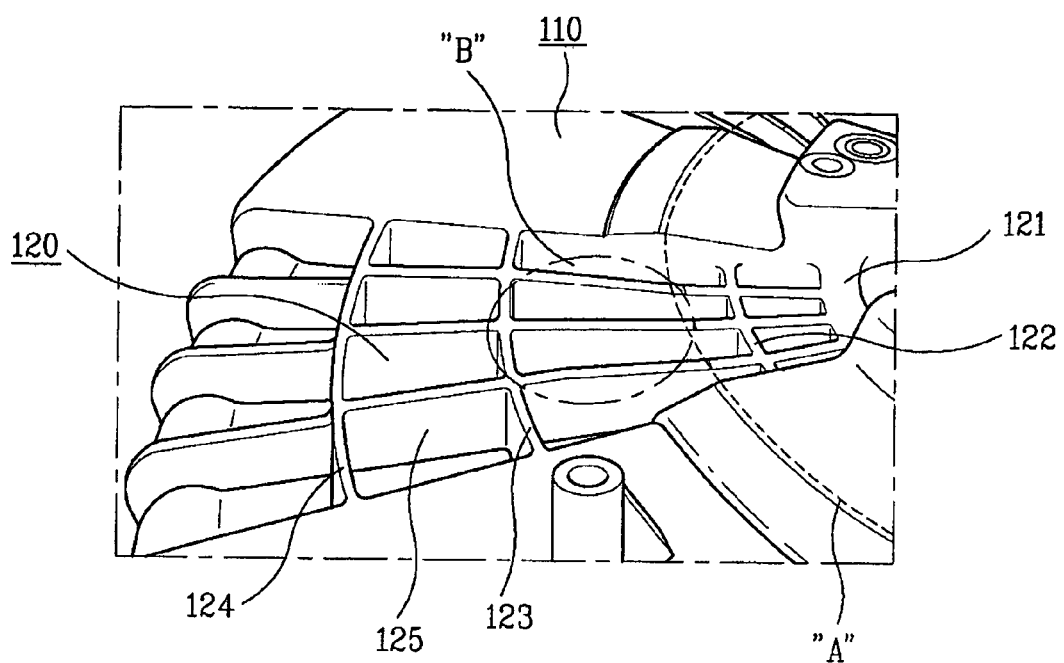
FIG. 18 is a perspective view illustrating enlarged key parts of FIG. 16.

Meanwhile, as shown in 'B' of FIG. 18, at least one portion of the radial rib 125 is inclined. The farther the radial rib is from the center, the higher the radial rib is inclined. As shown in FIG. 18, it is preferred that the inclined portion starts from the dotted 'A' portion. Since the portion where the flange part 8 is not inserted, especially, the portion farther from the center of the rear wall is weaker in the strength and rigidity, the strength and rigidity of the rear wall may be reinforced by heightening the rib.

The height of each circumferential rib 121~124 and 221~224 and the height of each radial rib 125 and 225 are the same in most portions thereof to prevent the stress from being concentrated only some part of the rear wall.

Figure 19:
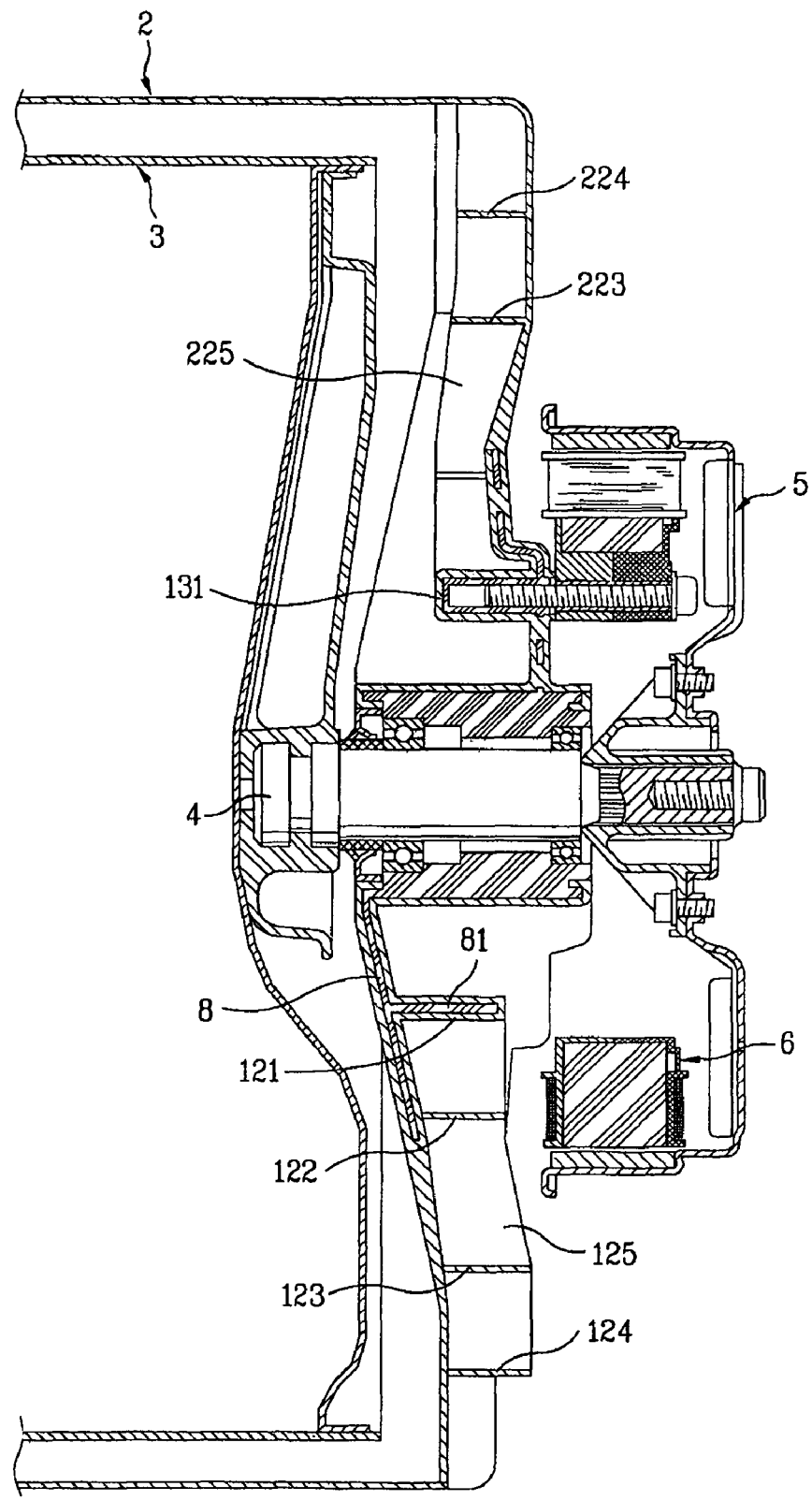
FIG. 19 is a sectional view illustrating that a motor is mounted in the tub of FIG. 16.

FIG. 19 illustrates a sectional view where the motor is mounted in the rear wall of the tub 2. The stator of the motor is fastened to the boss 131 of the rear wall of the tub 2 by a bolt, and a rotor 5 is connected with a shaft 4 and the shaft is connected with a drum 3.

Once the power is applied to the motor, the rotor 5 rotates to rotate the shaft 4. Hence, the drum 3 rotates. Since the drum is vibrated during the rotation, the vibration is transmitted to the rear wall of the tub through the shaft 4 and the bearing housing 7.

In case the number of rotor rotation is small due to the small capacity of the washing machine, the vibration of the drum 3 is also small. Thereby, the conventional rear wall of the tub is enough for the vibration. However, as recently the capacity of the washing machine has been getting larger, the number of the motor rotation is larger. Thus, there have been demands for a tub 2 having a structurally strengthened rear wall.

The rear wall of the tub 2 is invented through a process of trial and error to cause no problems in a state where the capacity of the washing machine is larger.

Figure 20:
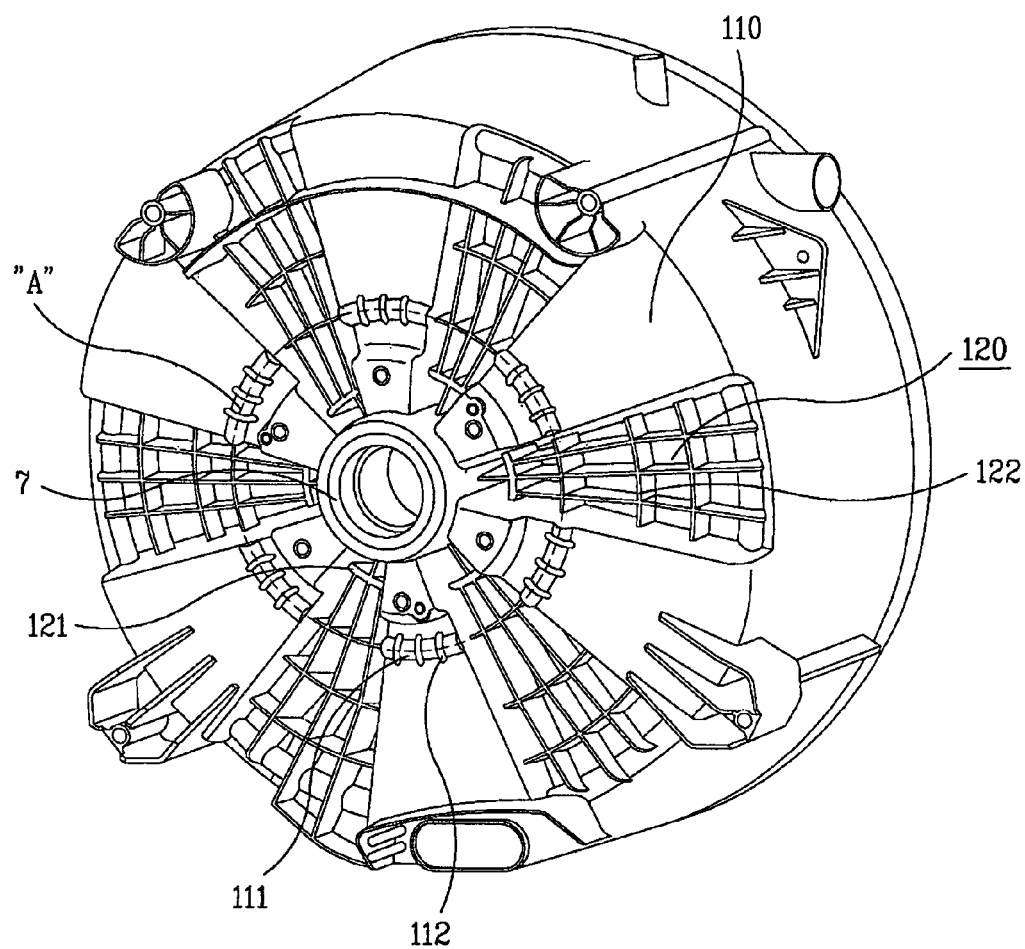
FIG. 20 is a diagram illustrating an outer surface center portion of a rear wall of a tub according to another embodiment of the present invention.
Figure 21:
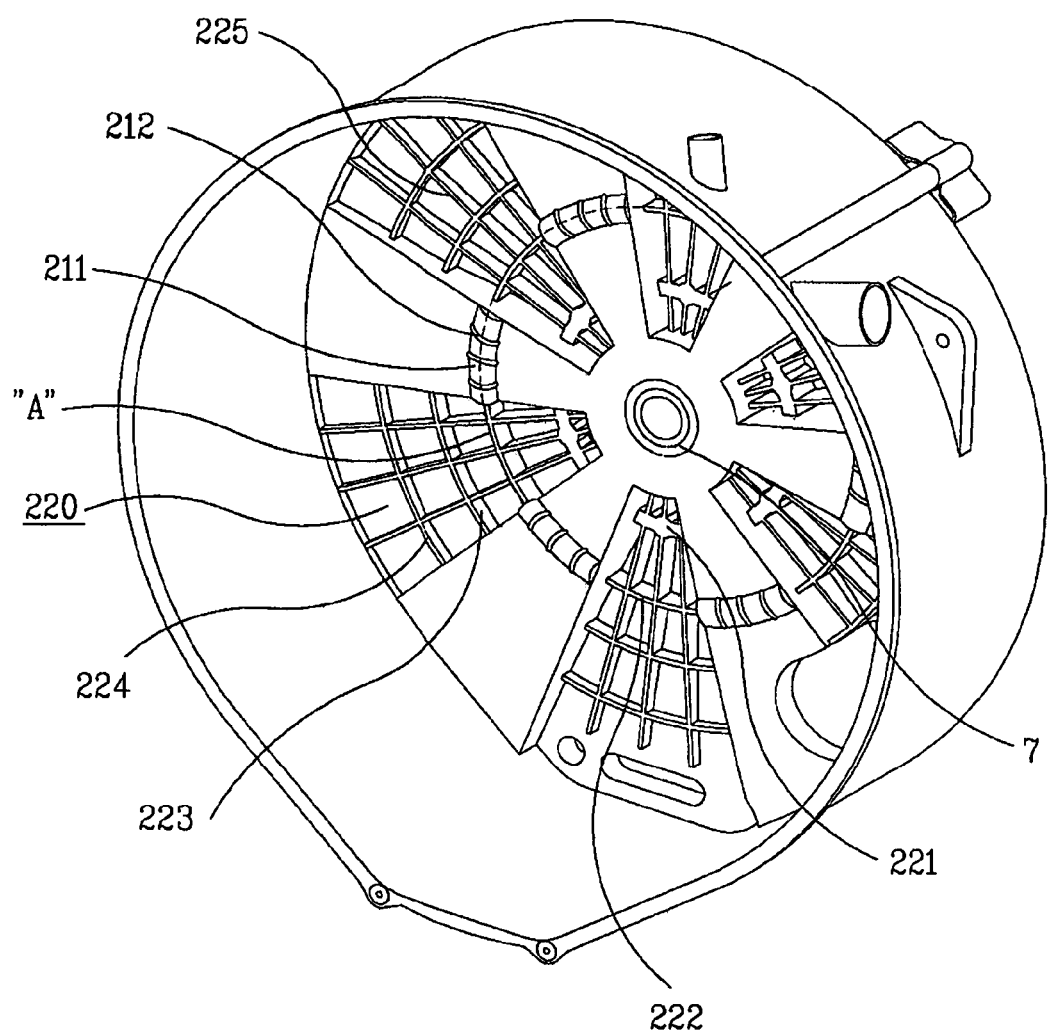
FIG. 21 is a diagram illustrating an inside of the tub in FIG. 20.

By the way, FIGS. 20 and 21 illustrate another embodiment of the present invention. Hereafter, only the different part from the above embodiment shown in FIG. 16 will be described.

Firstly, FIG. 20 illustrates an outer surface of a rear wall of a tub, and FIG. 21 illustrates an inner surface of the rear wall of the tub.

According another embodiment of the present invention, a circumferential rib 111 and 211 and a radial rib 112 and 212 are crossed on a projecting part 110 and 210. The ribs are provided on a circumference A where an outer end of a flange part 8 of a bearing housing 7 is provided. Thereby, the strength of the outer end of the flange part 8 of the bearing housing 7 may be reinforced.

In case that the circumferential rib 111 and 211 and the radial rib 112 and 212 are formed on the projecting part 110 and 210, the enough strength may be reinforced even when the circumferential ribs 121~124 and 221~224 formed on the recessing part 120 and 220 are provided on the circumference A.

Therefore, according to the present invention, the problems which the related art may cause will be solved.

Also, the rear wall of the tub injection-molded with the bearing housing inserted therein is structurally strengthened, because the recessing part and projecting part are formed on the rear wall of the rub along a circumferential direction. Here, the flange part of the bearing housing has the recessing part and the projecting part corresponding with the recessing part and the projecting part of the rear wall, such that the rear wall of the tub may be more structurally strengthened.

Furthermore, the strength and rigidity of the rear wall may be reinforced due to the circumferential rib and the radial rib formed on the rear wall of the tub. Especially, the ribs are formed on the recessing part. Thus, the thickness of the rear wall may be maintained and there may not be any problems related to disposition of the other components and tub capacity. Also, the rear wall of the tub may be gained, because the inventor proved the correlation between the circumferential rib position and the outer end of the flange part of the bearing housing.

The center portion of the rear wall affected by the vibration of the shaft may be structurally strengthened, because the circumferential rib nearest to the center of the rear wall is thicker than the other circumferential ribs, thereby, shaft being supported securely to rotate the drum smoothly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A washing machine comprising:
   a bearing housing having a flange part; and
   a tub injection-molded with the bearing housing including the flange part inserted into a wall thereof, the wall having a recessing part and a projecting part formed on an inner or an outer surface of the wall along a circumferential direction, and the flange part having a recessing part and a protecting part corresponding with the recessing part and the projecting part of the wall, respectively,
   wherein a rib is formed on the projecting part of the inner or the outer surface of the wall and corresponding to an outer circumferential end of the flange part.

2. The washing machine of claim 1, wherein a rib is formed on the recessing part of the inner or outer surface of the wall.

3. The washing machine of claim 2, wherein at least one portion of the rib formed on the recessing part of the wall is inclined upwardly from the center of the wall.

4. The washing machine of claim 1, wherein a plurality of circumferential ribs are formed on the recessing part of the wall of the tub, and the circumferential rib nearest to a center of the bearing housing is thickest among the plurality of circumferential ribs.

5. The washing machine of claim 4, wherein the flange part has a circumferential rib, wherein the circumferential rib of the flange part is inserted into the nearest circumferential rib of the tub.

6. The washing machine of claim 1, wherein a circumferential rib is formed on the recessing part of the wall of the tub that is in or in a substantially same circumference as a circumference on which a boss is formed on the flange part for allowing a stator to be fastened thereto.

7. The washing machine of claim 1, wherein the rib formed on the projecting part is at least one of a circumferential rib or a radial rib.

8. The washing machine of claim 1, wherein the rib formed on the projecting part protrudes from a surface of the projecting part.

9. The washing machine of claim 1, wherein the rib formed on the projecting part comprises at least one circumferential rib part and at least one radial rib part.

10. The washing machine of claim 1, wherein a rib formed on the recessing part is at least one of a circumferential rib or a radial rib.

11. The washing machine of claim 1, wherein the tub comprises at least one rib on the projecting part of the wall and at least one rib on the recessing part of the wall, wherein the at least one rib on the projecting part and the at least one rib on the recessing part aligns with each other in a circumferential direction.

12. The washing machine of claim 1, wherein the flange part further comprises a boss for fastening a stator, and the rib on the projecting part of the wall is located further away from the boss with respect to the center of the bearing housing.

13. The washing machine of claim 1, wherein a inclined portion at the wall starts at or approximately at an outer end of the flange part.

14. A washing machine comprising:
a bearing housing having a flange part; and
a tub injection-molded with the bearing housing including the flange part inserted into a wall thereof, the wall having a recessing part and a projecting part formed on an inner or an outer surface of the wall along a circumferential direction, the flange part having a recessing part and a projecting part corresponding with the recessing part and the projecting part of the wall, respectively; and
at least two ribs formed on the recessing part, wherein one rib is spaced apart inward immediate to an outer circumferential end of the flange part in a radial direction and another rib is spaced apart outward immediate to the outer circumferential end of the flange part in a radial direction.

* * * * *